US006660121B2

(12) United States Patent
Harvey et al.

(10) Patent No.: US 6,660,121 B2
(45) Date of Patent: **\*Dec. 9, 2003**

(54) CONTINUOUS MOLDING OF FASTENER PRODUCTS AND THE LIKE AND PRODUCTS PRODUCED THEREBY

(75) Inventors: Andrew C. Harvey, Waltham, MA (US); Stephen C. Jens, Winchester, MA (US); Howard A. Kingsford, Amherst, NH (US); J. Scott Neumann, Natick, MA (US); Richard M. Formato, Shrewsbury, MA (US)

(73) Assignee: Velcro Industries B.V., Curacao (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/282,716

(22) Filed: Oct. 29, 2002

(65) Prior Publication Data

US 2003/0041957 A1 Mar. 6, 2003

Related U.S. Application Data

(62) Division of application No. 09/402,975, filed on Oct. 14, 1999, now Pat. No. 6,482,286, which is a continuation of application No. PCT/US98/07873, filed on Apr. 16, 1998, which is a continuation of application No. 08/838,279, filed on Apr. 16, 1997, now Pat. No. 5,945,131.

(51) Int. Cl.[7] .............................................. B29C 47/00
(52) U.S. Cl. ............................ 156/244.27; 156/309.9; 264/167; 264/313
(58) Field of Search ......................... 156/244.27, 309.9, 156/72, 66, 308.2; 264/167, 210.2, 211.12, 296, 313; 425/141, 149, 150, 363, 224, 471, 367

(56) References Cited

U.S. PATENT DOCUMENTS

| 1,988,787 A | * | 1/1935 | Fowler ........................ 264/167 |
| 2,897,538 A | | 8/1959 | Shapiro et al. ............. 425/367 |
| 3,089,191 A | | 5/1963 | Conrad ........................ 425/367 |
| 3,240,148 A | | 3/1966 | Varga ........................... 425/367 |
| 3,312,583 A | | 4/1967 | Rochlis |
| 3,353,663 A | | 11/1967 | Kayser et al. |
| 3,363,663 A | | 1/1968 | Kayser et al. |
| 3,594,863 A | | 7/1971 | Erb ................................ 18/5 |
| 3,594,865 A | | 7/1971 | Erb et al. |
| 3,752,619 A | | 8/1973 | Menzin et al. |

(List continued on next page.)

FOREIGN PATENT DOCUMENTS

| DE | 20175221 | 12/1971 |
| EP | 0 934 706 | 8/1999 |
| WO | WO 98/27840 | 7/1998 |

*Primary Examiner*—Mark Eashoo
(74) *Attorney, Agent, or Firm*—Fish & Richardson P.C.

(57) ABSTRACT

Improvements are disclosed for an apparatus for continuously molding small fastener elements integral with a base web from a flowable resin. The apparatus comprises a cylindrical mold roll rotatable about an axis and defining small fastener element-shaped mold cavities in the surface thereof, and pressure-applying means to apply operating pressure to force the resin into the cavities at a pressure zone. The pressure-applying means and mold roll define a mold gap therebetween for forming the base web. The advantageous use of relatively long mold rolls, to produce a correspondingly wide web, and the use of higher molding pressures, e.g. to form very small fastener elements, is enabled by various improvements, including means to maintain the mold gap at a desired thickness profile across the length of the molding region of the mold roll under operating pressure. In some cases the pressure-applying means includes a pressure roll, in other cases it includes a resin nozzle assembly or pressure head. In some other cases it includes a belt. Various control schemes are also disclosed, as are means to provide cooling. In some particularly useful embodiments, at least one of the rolls of the apparatus has a resiliently deformable surface. Methods of molding fastener elements directly on a sheet material, such as sandpaper, are also disclosed, as well as methods for laminating.

26 Claims, 17 Drawing Sheets

U.S. PATENT DOCUMENTS

| | | |
|---|---|---|
| 3,756,760 A | 9/1973 | McBride |
| 3,956,056 A | 5/1976 | Boguslawski et al. |
| 3,983,278 A | 9/1976 | Wardle |
| 4,015,919 A | 4/1977 | Pawelczyk .................. 425/367 |
| 4,117,054 A | 9/1978 | Salo |
| 4,124,349 A | 11/1978 | Lehmann .................... 425/367 |
| 4,137,034 A | 1/1979 | Moertel ...................... 425/545 |
| 4,596,523 A | 6/1986 | Whitehead |
| 4,605,366 A | 8/1986 | Lehmann et al. |
| 4,794,028 A | 12/1988 | Fischer |
| 5,057,167 A | 10/1991 | Gersbeck .................. 156/62.2 |
| 5,147,592 A | 9/1992 | Sato et al. |
| 5,217,532 A | 6/1993 | Sasame et al. |
| 5,240,666 A | 8/1993 | Schnyder et al. |
| 5,254,194 A | 10/1993 | Ott et al. |
| 5,260,015 A | 11/1993 | Kennedy et al. ............. 264/167 |
| 5,263,840 A | 11/1993 | Heitmann et al. .......... 425/363 |
| 5,393,475 A | 2/1995 | Murasaki et al. |
| 5,441,687 A | 8/1995 | Murasaki et al. |
| 5,744,080 A * | 4/1998 | Kennedy et al. ............. 264/167 |
| 5,785,784 A * | 7/1998 | Chesley et al. ............. 156/231 |
| 5,945,131 A * | 8/1999 | Harvey et al. ............... 425/141 |
| 6,013,151 A * | 1/2000 | Wu et al. ................... 156/229 |
| 6,296,731 B1 * | 10/2001 | Fujii et al. ................... 156/209 |
| 6,482,286 B1 * | 11/2002 | Harvey et al. ......... 156/244.27 |

* cited by examiner

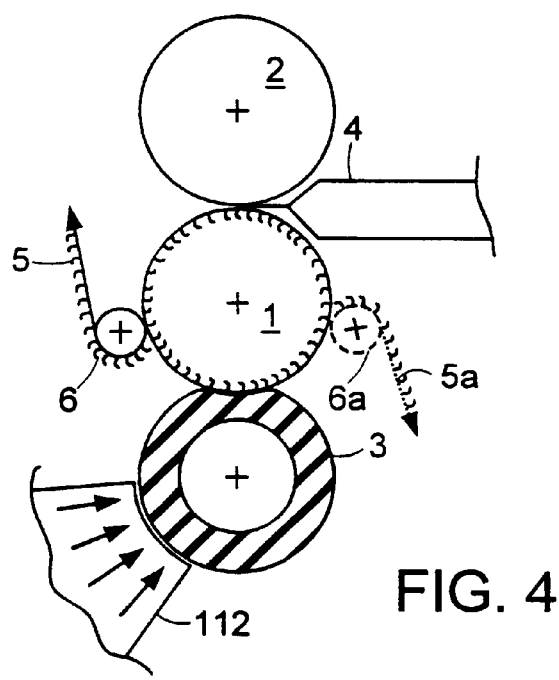
FIG. 4
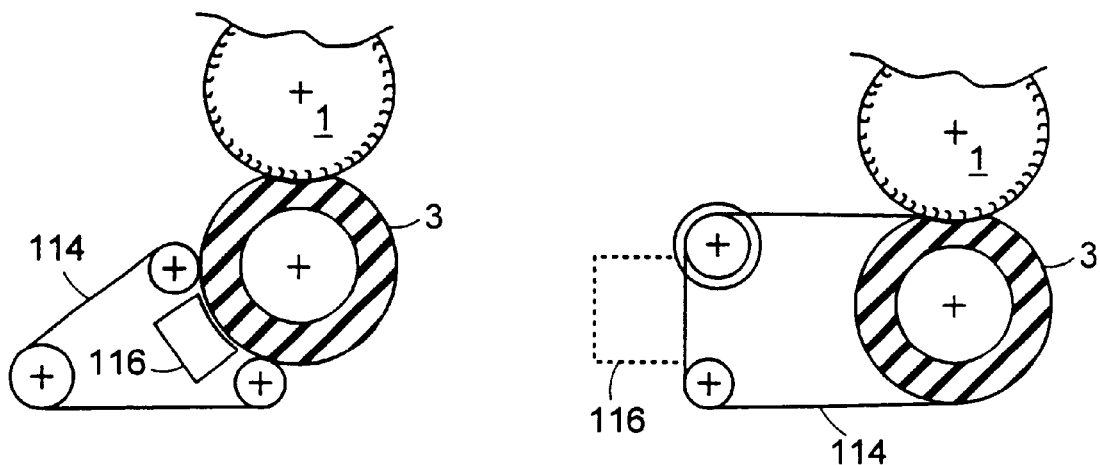
FIG. 5
FIG. 6

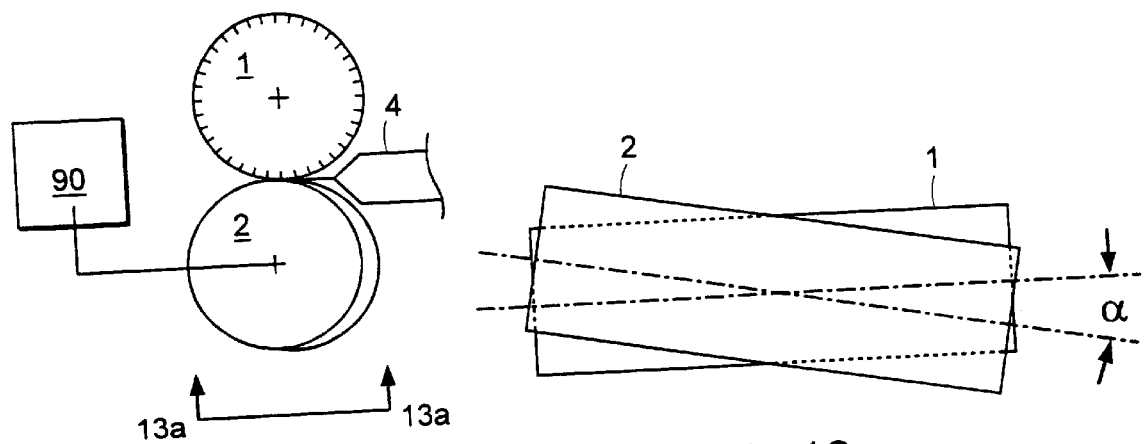
FIG. 13
FIG. 13a
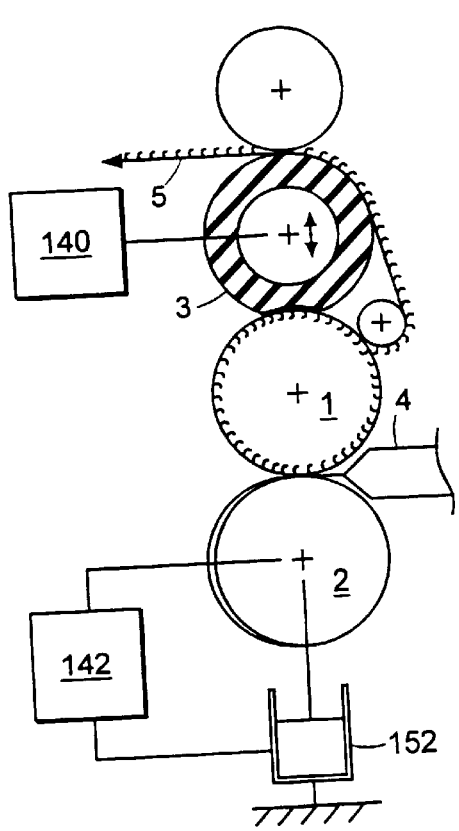
FIG. 14
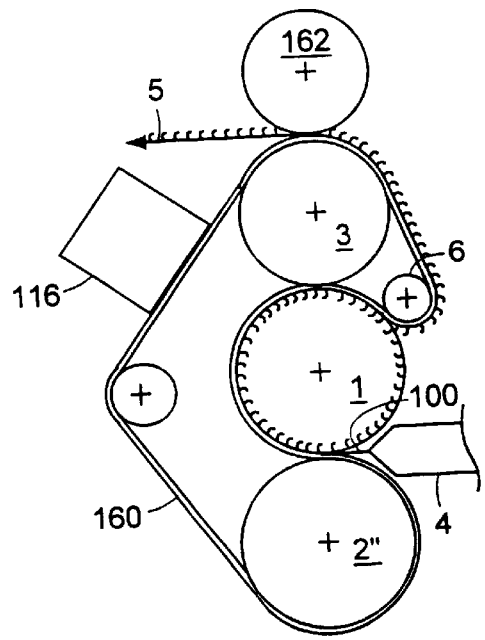
FIG. 15

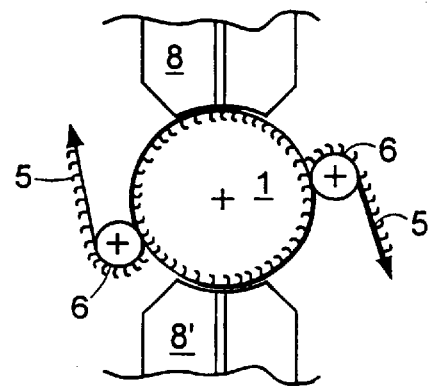
FIG. 27
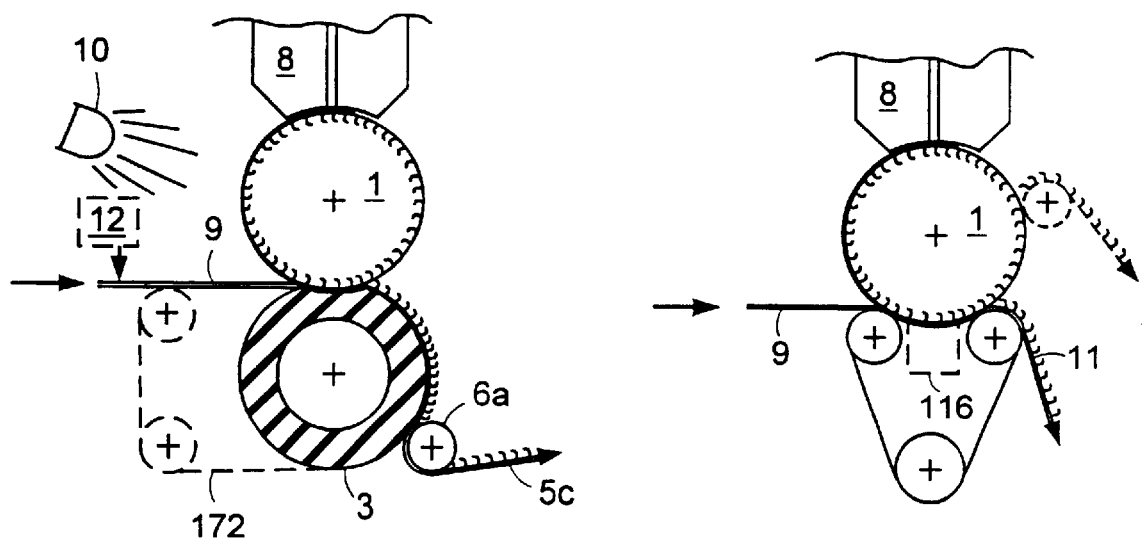
FIG. 28
FIG. 29

CONTINUOUS MOLDING OF FASTENER PRODUCTS AND THE LIKE AND PRODUCTS PRODUCED THEREBY

This is a divisional of U.S. Ser. No. 09/402,975, filed Oct. 14, 1999 and issued as U.S. Pat. No. 6,482,286, which is a continuation of International Patent Application No. PCT/US98/07873, filed Apr. 16, 1998, which is a continuation of U.S. Ser. No. 08/838,279, filed Apr. 16, 1997 and now issued as U.S. Pat. No. 5,945,131.

BACKGROUND OF THE INVENTION

This invention relates to improved equipment and methods for making continuous fastener products and the like, and to products produced by the equipment and methods.

Fastener products, such as hook components of hook-and-loop fasteners, are manufactured by a continuous molding method employing a cylindrical mold roll which has fastener-shaped cavities formed in its periphery. Often the mold roll is formed of an axially compressed stack of ring-form mold plates. In operation, molten polymer from an extruder is introduced into a pressure zone in which the molten polymer is forced under high pressure into the fastener cavities of the cooled mold roll, to form fastener elements (e.g. hooks) integrally molded with a base layer. In some cases the pressure zone is a nip formed by a mold roll and an adjacent pressure roll. In other configurations the pressure zone is formed between a conforming stationary pressure head and a mold roll. Typically, the smaller the fastener elements (or the like), the faster the optimal production speed. The more viscous the resin, or the lower the temperature of the cooled roll, the higher must be the pressure achieved in the pressure zone in order to make a satisfactory product. Typically, mold rolls of about 10 inch diameter and 12 inches in axial length have been employed.

SUMMARY OF THE INVENTION

We have realized that many advantages can be obtained by employing longer mold rolls and correspondingly wide pressure zones to form wide products, while providing means to accommodate effects of the distribution of pressure along the length of the mold roll. By this means, products molded with wide widths can have uniform product thickness and other properties previously found only in narrower materials.

We also have realized that many advantages can be obtained by raising the pressure in the pressure zone, with a conventional roll or a longer roll, to form products having finer features while providing means to accommodate effects of the distribution of pressure along the length of the mold roll.

We have realized that, because of the construction of the molding region of the mold roll as a stacked series of rings or plates about a central shaft, the mold roll has limited bending resistance. As a result, if the molding region of the mold roll is made long to produce a wide product, or if the pressure of the resin is increased, the tendency of the mold roll to bend away from the pressure zone under the extreme molding pressure can cause small separations between adjacent mold plates and undesirable base layer thickness variation across the width of the product (i.e. gap variation along the length of the molding region). Also, we realize that non-uniform geometry of the pressure zone can produce detrimental nonuniformity in the pressure distribution across the pressure zone, which can lead to incomplete filling of some of the mold cavities.

According to one aspect of the invention, improvements are made in an apparatus for continuously molding fastener elements integral with a base web from a flowable resin. The apparatus comprises a cylindrical mold roll rotatable about an axis and defining small fastener element-shaped mold cavities in the surface thereof, and pressure-applying means to apply elevated operating pressure to force the resin into the cavities at a pressure zone. The pressure-applying means and mold roll define a mold gap therebetween for forming the base web. The provided improvements include means to maintain the mold gap at a desired thickness profile across the length of the molding region under operating pressure that would otherwise tend to produce gap variations.

The provided improvements are particularly useful if the molding region of the mold roll is lengthened to about 12 inches or more or if the operating pressure is raised to higher levels, such that the mold roll is subject to loads in the range of about 1000 to 1600 pounds per lineal inch along the mold roll.

In a preferred configuration, the mold roll comprises an axially arranged stack of a large multiplicity of disks, at least many of which have mold cavities at their peripheral surfaces.

In certain advantageous embodiments, the means to maintain the mold gap comprises a moving support member on the side of the mold roll generally opposite the pressure-applying means. The support member is disposed to engage the peripheral surface of the mold roll with sufficient force to resist radial deflection of the mold roll. Preferably a support member controller is provided to vary the amount of engagement between the mold roll and the support member in response to operating conditions.

In certain embodiments, the apparatus includes a sensor to provide operating condition information to a support member controller. In some cases the sensor is constructed to detect the presence of molded resin on the peripheral surface of the mold roll and the controller is constructed to disengage the support member from the peripheral surface of the mold roll when resin is not present. In certain arrangements, the sensor is constructed to respond to a condition of the apparatus that is related to the pressure in the pressure zone.

In some preferred embodiments of the invention the depth of the mold cavities from the surface is between about 0.004 and 0.035 inches, preferably between about 0.005 and 0.020 inches, and more preferably between about 0.006 and 0.012 inches.

Broadly, the invention relates to completed fastener elements and to components or preforms that form a part of, or are modified to form, a completed fastener. The term "fastener element" as used herein is intended to include all of these forms.

In some embodiments, however, the mold cavities preferably define the shape of functional fastener elements. In some preferred arrangements the mold cavities at least partially define the shape of loop or fiber-engaging hook elements, each element having a pedestal or stem portion and at least one head portion that projects to a side of the pedestal or stem portion. In other arrangements, the fastener elements are of mushroom shape or of stem-shaped preforms that are subsequently processed to form mushrooms or other elements having flat or rounded heads.

In some particularly useful embodiments, the support member that engages the mold roll has a peripheral surface that is resiliently deformable to conform, in the vicinity of its engagement with the mold roll, generally to the peripheral surface of the mold roll. In some of these instances, the portion of the support member that directly contacts the surface of the mold roll is of a resilient substance, preferably an elastomeric material.

In some preferred embodiments the support member comprises a generally cylindrical roll arranged to rotate about an axis of rotation, while in some other embodiments the support member comprises a belt supported to engage the mold roll with substantial pressure.

In some embodiments the means to maintain the mold gap comprises adjustable structure to elastically deform the shape of the pressure-applying means, to conform to axial deflection of the mold roll. In some cases, the pressure-applying means comprises a pressure roll, the mold gap comprises a nip between the mold roll and pressure roll, and the means to elastically deform the shape is constructed to bend the axis of the pressure roll to maintain the mold gap. In some other cases, the pressure-applying means comprises a nozzle assembly for introducing the resin to the pressure zone under pressure, the mold gap comprises a gap between this nozzle assembly and the mold roll, and the means to elastically deform the shape is constructed to bend the nozzle assembly along the length of the mold gap to maintain the mold gap.

In some preferred embodiments the pressure-applying means comprises a pressure roll rotatable about an axis and positioned to form a nip with the mold roll to provide the mold gap. The means to maintain the mold gap includes a controller to vary the angle between the axes of the pressure and mold rolls to introduce skew to compensate for mold roll deflection under operating pressure.

In various arrangements according to the invention, means are provided to extract heat from the surface of the support member to cool the support member, thus to withdraw heat from the molding process.

According to another aspect of the invention, an apparatus is provided for continuously molding two streams of fastener product from flowable resin, each product comprising a base web with integral fastener elements. The apparatus has a cylindrical mold roll rotatable about an axis and defining small fastener element-shaped mold cavities in its surface in a molding region. The apparatus also has first and second pressure-applying means to apply operating pressure to force the resin into the cavities of the mold roll at corresponding first and second pressure zones. The first and second pressure-applying means and the mold roll define corresponding first and second mold gaps therebetween for forming the base webs in the molding region. First and second product-removing means are included to remove the product from the mold roll. The first and second pressure-applying means are advantageously arranged on generally opposite sides of the mold roll, such that bending loads applied to the mold roll by the elevated operating pressures of the two pressure applying means are substantially balanced. Preferably, the mold roll is of extended length of about 12 inches or more to produce correspondingly wide webs.

In some embodiments the first and second pressure-applying means each comprises a pressure roll and the first and second mold gaps each comprises a nip between the mold roll and a corresponding pressure roll.

In some other embodiments, the first and second pressure-applying means each comprises a nozzle and shoe assembly for introducing the resin to the corresponding pressure zone under pressure and the first and second mold gaps each comprises a gap between a corresponding nozzle assembly and the mold roll.

According to another aspect of the invention, an apparatus, for continuously molding small fastener elements integral with a base web from a flowable resin, has a cylindrical mold roll rotatable about an axis and defining fastener element-shaped mold cavities at its surface in a molding region, and pressure-applying means are arranged to apply operating pressure to force the resin into the cavities at a pressure zone. The pressure-applying means and mold roll define a mold gap therebetween for forming the base web in the molding region. The apparatus includes a roll arranged to engage the mold roll with substantial force, and which has a resiliently deformable surface to conform, in the vicinity of its engagement with the mold roll, generally to the peripheral surface of the mold roll along the molding region.

In some embodiments, the molding region of the mold roll is of about 12 inches or more in length and the resiliently deformable roll comprises a pressure roll positioned to form a wide nip with the mold roll to provide the mold gap, to form a correspondingly wide web. In these and other embodiments, preferably a substantially elevated pressure is maintained in the pressure zone to produce a load of between about 1000 and 1600 pounds per lineal inch against the mold roll in the molding region.

In some embodiments, the resiliently deformable roll comprises a support roll disposed to engage the mold roll on the side generally opposite the pressure-applying means to resist deflection of the mold roll.

In some embodiments useful for producing a laminated fastener product comprising a molded web and a backing material, the resilient roll and the mold roll define therebetween a laminating zone for laminating the molded web to the backing material.

According to another aspect of the invention, an apparatus for continuously molding fastener elements integral with a base web from a flowable resin has a cylindrical mold roll rotatable about an axis and defining fastener element-shaped mold cavities at a surface thereof, pressure-applying means to apply operating pressure to force the resin into the cavities at a pressure zone (the pressure-applying means and mold roll defining a mold gap therebetween for forming the base web), and a belt arranged to engage the mold roll.

In some embodiments the belt is arranged to engage the mold roll on the side generally opposite the pressure-applying means to resist radial deflection of the mold roll.

In some embodiments the belt and the mold roll define a laminating zone therebetween for laminating the molded web to a backing material.

In some cases, the belt is constructed to extract heat from the surface with which it is engaged.

According to another aspect of the invention, certain other improvements are provided in an apparatus for continuously molding fastener elements integral with a base web. The apparatus has a cylindrical mold roll rotatable about an axis and defining fastener element-shaped mold cavities in the peripheral surface thereof, and a nozzle assembly to introduce a flowable resin to the cavities. The nozzle assembly is constructed and arranged to apply operating pressure to force the resin into the cavities at a pressure zone, and the nozzle assembly and mold roll define a mold gap therebetween for forming the base web, the apparatus including means to maintain the mold gap at a desired thickness profile across the width of the wide web under the operating pressure if the roll is lengthened or if the operating pressure is raised to higher levels such that the mold roll is subject to loads in the range of about 1000 to 1600 pounds per lineal inch along the mold roll.

In some embodiments the means to maintain the mold gap comprises a support member disposed to engage the mold roll on the side generally opposite the nozzle assembly with sufficient force to resist radial deflection of the mold roll, and a controller constructed to vary the amount of engagement between the support member and the mold roll. In some cases the support member is resiliently deformable.

In some embodiments the means to maintain the mold gap comprises an actuator to elastically bend the nozzle assembly to conform to radial deflections of the mold roll to maintain the mold gap, and a controller constructed to control the actuator to vary the amount of bending of the nozzle assembly.

According to another aspect of the invention, an apparatus for continuously molding fastener elements integral with a base web includes a cylindrical mold roll, preferably of extended length to provide a correspondingly wide web, and a cylindrical pressure roll. The mold roll is rotatable about an axis and comprises multiple stacked disks having fastener element-shaped mold cavities in their peripheral surfaces. The cylindrical pressure roll is arranged to engage the mold roll at a nip to form a mold gap for forming the base web. The pressure roll is constructed to apply operating pressure to force the resin into the cavities. The apparatus also includes an extrusion die to introduce a flowable resin to the nip, and means to maintain the mold gap at a desired thickness profile across the width of the wide web under the operating pressure, preferably a substantially elevated pressure.

In some embodiments the means to maintain the mold gap comprises a support roll arranged to engage the mold roll on the side generally opposite the nozzle assembly with sufficient force to resist radial deflection of the mold roll, and a controller constructed to control the amount of engagement between the support roll and the mold roll in response to operating conditions.

In some embodiments the means to maintain the mold gap includes a controller to vary the angle between the axes of the pressure and mold rolls to introduce skew to compensate for mold roll radial deflection under operating pressure.

By "radial deflection" as used herein, we mean any lateral deflection of any portion of the axis of the roll, including bending or bowing deflections.

According to another aspect of the invention, an apparatus for continuously molding fastener elements integral with a base web includes a cylindrical mold hoop rotatable about an axis and having fastener element-shaped mold cavities in its peripheral surface. The apparatus also has at least one driven roll arranged to engage an inner surface of the mold hoop to drive the hoop and a pressure-applying means arranged to apply operating pressure to force the resin into said cavities at a pressure zone.

In some embodiments of the apparatus of the invention, the pressure-applying means is constructed to apply first and second operating pressures at corresponding first and second said pressure zones at first and second mold gaps, respectively, with the mold roll. In some instances, the pressure-applying means comprises a nozzle assembly for introducing resin to the first pressure zone at the first operating pressure, the first mold gap comprising a gap between the nozzle assembly and the mold roll. In some cases, the pressure-applying means also includes a pressure roll, the second mold gap comprising a nip between the mold roll and pressure roll.

According to another aspect of the invention, a method of continuously molding fastener elements on one broad side of a sheet product opposite another broad side having surface features, e.g., raised or indented portions, is provided. The method comprises providing an apparatus that includes a mold roll, resiliently deformable pressure roll, and an extruder die, all as described above, passing a sheet product having the surface features through the nip with the molten resin such that the resilient surface of the pressure roll conforms in the vicinity of the features to protect the features as they pass through the nip. The method also includes forming fastener elements integral with a base web on a broad side of the sheet product.

In some embodiments, an abrasive sheet product having molded fastener elements on one side and abrasive particles on the other side is formed by the in situ laminating method just described, in which the surface features comprise abrasive particles.

In some embodiments the surface features comprise a decorative texture such as an enclosed pattern or decorative fibers as in grass cloth. In some embodiments, the sheet product comprises a wall covering covered on its back side with fastener elements.

Various aspects of the invention disclosed here enable cost-effective commercialization of molded fastener products of extremely wide widths and products having many very small fastener elements. In particular, fastener products with very thin base layer thicknesses held to very close dimensional tolerances can be produced in a practical manner. According to another aspect of the invention, the contact from loading systems that are provided according to the invention in the form of load rolls or load belts, are advantageously employed to extract heat from the back of the base layer of the product, to enable production of thicker base layers or to produce a product with a given base thickness at a much higher production speed than has previously been possible.

As will be understood from the foregoing and the remaining description and drawings, various features of the different aspects of the invention may be advantageously combined in other embodiments for certain applications.

BRIEF DESCRIPTION OF THE DRAWINGS

FIGS. 4–6 show various methods of cooling a load roll. (FIGS. 5 and 6 employ cooling belts).

FIG. 13 illustrates skewing a pressure roll.

FIG. 13A is a bottom view of the skewed rolls, taken from direction 13A—13A in FIG. 13.

FIG. 14 shows a system employing skewing and gross load control.

FIG. 15 illustrates the use of a cooling belt for a molding system.

FIG. 27 is of a dual pressure head system.

FIGS. 28 and 29 illustrate laminating in a pressure head system.

DESCRIPTION OF THE PREFERRED EMBODIMENTS

Figure 1:
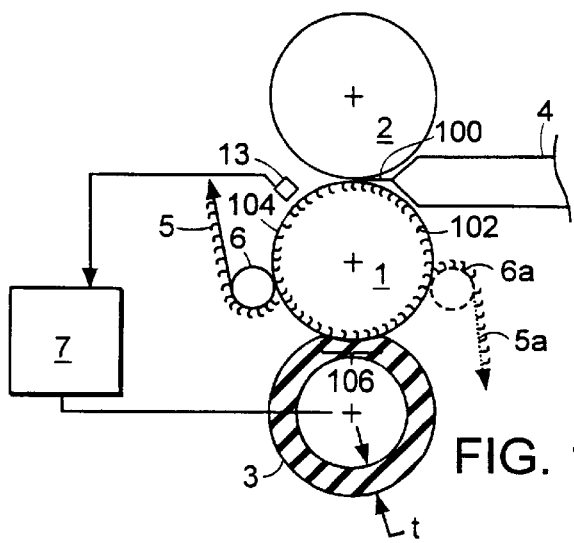
FIG. 1 shows a molding system with a conformable load roll according to the invention.

Referring to the embodiment of FIG. 1, an extruder 4 delivers a wide extrusion of molten polymer 100 into the nip (i.e. into the pressure zone) between an elongated mold roll 1 and a pressure roll 2. The polymer is forced into fastener-shaped cavities 102 by the pressure of the nip, forming a base layer with integral fastener elements. The fastener elements are, in some cases, fully-formed elements capable of snagging loops as molded. In other cases, the fastener elements are preform elements that are intended to be subjected to a post-forming operation to form completed fastener elements. The post-forming operation, in some cases, forms flat top portions on hook or post preforms. The fastener elements are very small to engage small loops or fibers on a surface, and typically are arranged on the web base with a density of 500 to 2,000 fastener elements per square inch.

The fastener product 5 is carried on the chilled mold roll 1 a distance sufficient to solidify the fastener elements before removing the elements from their mold cavities 102. A take-off roll 6 is employed to peel the fastener product 5 from mold roll 1. Typically the nip pressure is controlled by actuators (not shown) that force pressure roll 2 against mold roll 1.

A load roll 3, on the side of mold roll 1 opposite to the side of the pressure zone, is arranged to engage mold roll 1 to resist the bending of mold, roll 1 that would otherwise occur due to pressure zone forces. By "engage" we mean that the load roll 3 either directly contacts the load roll surface or resin or other product layer on the surface of the load roll, with a substantial contact force. The force exerted by load roll 3 against mold roll 1 is controlled by a control system 7. Control system 7 varies the position of the load roll to control the load applied to mold roll 1 to result in a more uniform product base layer thickness, and to protect against accidental contact between the mold roll and pressure roll. The load applied by the load roll to mold roll 1 is preferably about the same as the load applied against the mold roll by pressure roll 2.

In a preferred embodiment, load roll 3 (a support roll) has a resilient external layer of thickness t (shown exaggerated in the figure), such as 0.5 inch of urethane elastomer. The compliance of the relatively soft external layer of load roll 3 results in a relatively wide contact area 106 between load roll 3 and mold roll 1 and lower average contact pressures than the pressure in the nip between mold roll 1 and pressure roll 2. It also provides more uniform load distribution along the axis of the roll, compensating for small radial deflections of rolls 1 and 2. The relatively low contact pressure avoids damage to the delicate mold surface (e.g. coining or fatigue in the region of the mold cavities) that would result from high pressure, direct contact with a hard load roll. The integration of the component of this contact pressure parallel to the plane of the axes of the mold and pressure rolls 1 and 2 provides a reaction force to balance the bending force applied to mold roll 1 by nip pressure. Load roll 3 is preferably constructed and arranged to provide a reaction load substantially equal to the bending load from the pressure zone, thereby maintaining the straightness of mold roll 1, and the uniformity of the gap along the length of the rolls.

Control system 7 responds to the thickness of the base layer of the product while on the mold roll, as measured by thickness sensor 13, and adjusts the reaction load applied by load roll 3 accordingly. In an alternative embodiment, sensor 13 is replaced by a means to measure the distance between rolls 1 and 2.

Also shown in FIG. 1, in dashed lines, is an alternative placement for the take-off roll, shown as take-off roll 6a. In this alternative embodiment, the product as it cools is carried by mold roll 1 through a second nip between the mold roll and load roll 3, and is subsequently peeled away by take-off roll 6a as fastener product 5a. This alternative embodiment is especially useful when longer cooling times are desired, as it enables the cooling fastener product to be carried by chilled mold roll 1 for a longer time to conduct more heat from the product. Leaving the product in the mold cavities during contact with load roll 3 also can provide important protection to the mold cavities from damage when high loading pressures are employed, as with rolls having a hard outer layer. In embodiments where load roll 3 is cooled, e.g. by controlled flow of coolant through its interior, additional heat is advantageously extracted from the back side of the product as it passes through the second nip. The relatively wide contact area between mold roll 1 and load roll 3 can help to promote this heat transfer.

The machine and process shown in solid lines in FIG. 1 are useful when molding delicate products that may tend to be damaged from travelling through the second nip, whereas the machine and process shown in dashed lines is useful for more rugged products and for high speed production.

Figure 1A:
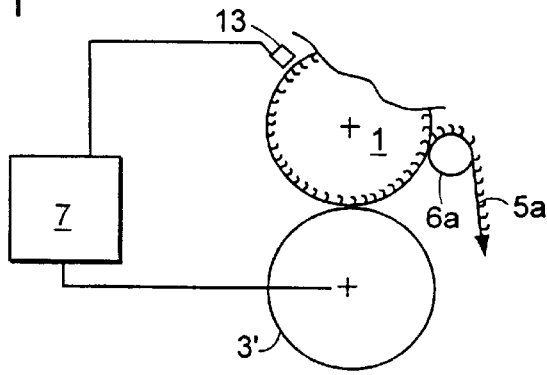
FIG. 1A shows a molding system similar to FIG. 1 with a non-conformable load roll.

As shown in FIG. 1A, passing the cooling product through the nip between mold roll 1 and load roll 3' enables, in another embodiment, the use of a non-conformable load roll 3'. In this embodiment the presence of the resin in the cavities and between the load roll and the mold roll provides important protection to the surface of the mold roll and the mold cavities. Without the product present in the nip between the mold roll and the load roll, the features of the surface of the mold roll (e.g. mold cavities 102) would be susceptible to damage from high contact or Hertzian stresses, which can be hundreds of thousands of pounds per square inch. These high contact stresses can, for instance, deform the mold roll surface plastically such as by coining or flattening the tips of some of the fastener-shaped cavities. Even if the mold roll surface is not deformed instantly, the repeated, localized stress applied to the metal forming the inside of a hook-shaped fastener from such hard surface contact can cause fatigue and fracture, resulting in some of the hooks being deformed and the resulting product having an unattractive appearance.

Further features are provided to avoid applying a substantial load to mold roll 1 by hard load roll 3' of FIG. 1A when there is not sufficient polymer product in the load roll nip to protect the mold cavities. In one case, thickness sensor 13 is adapted to detect an interruption in the flow of product. Control system 7 is adapted to respond by quickly unloading load roll 3', thereby avoiding direct contact load against a bare mold roll.

In FIGS. 1 and 1A the axis of load roll 3 or 3' was substantially in the plane of the axes of mold roll 1 and pressure roll 2, all three axes being substantially parallel.

Figure 2:
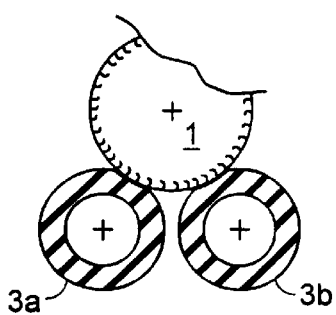
FIG. 2 illustrates the use of twin conformable load rolls.

Referring to FIG. 2, another embodiment has two load rolls 3a and 3b that are generally opposite the pressure zone between mold roll 1 and the pressure roll, but whose axes are out of the plane of the mold roll and pressure roll. Load rolls 3a and 3b are shown to be preferably arranged in a symmetric or balanced manner about the plane defined by the axis of the upper rolls. The axes of load rolls 3a and 3b are parallel with each other and substantially parallel with the axes of the upper rolls. This double load roll arrangement advantageously results in an even larger net contact area against mold roll 1 and even lower average contact pressure.

Referring back to FIG. 1, one embodiment of the control system employs manual adjustment by the operator of the pressure applied by load roll 3. At start up, a release paper is passed with the extruded polymer through the nip between mold roll 1 and pressure roll 2, the paper covering cavities 102 so that the initial melt from the extruder does not enter the cavities. The release paper continues to pass through the nip until the surface of mold roll 1 and cavities 102 reach an appropriate operating temperature and speed. At this point, because of the presence of the release paper covering the cavities, the product 5 or 5a has no fastener elements. When operating conditions are reached, but before applying substantial pressure from either pressure roll 2 or load roll 3, entry of the release paper into the nip is discontinued, exposing cavities 102 to the molten polymer, which begins to flow into the cavities to form partial fastener elements. The load between pressure roll 2 and mold roll 1 is then increased by moving the pressure roll closer to the mold roll until there is enough pressure developed on the melt to completely fill cavities 102 under the desired conditions. At this point, fastener product 5 or 5a has useful, fully-formed fastener elements integrally molded with the base layer, although the uniformity of the product is affected by the longitudinal bending of mold roll 1, resulting in a base layer that is typically thicker in the middle of the product than on the edges. While measuring the thickness of the base layer (e.g. by thickness sensor 13), the loads applied by pressure roll 2 and load roll 3 are increased until a desirable product is produced.

In a typical operation the load applied by pressure roll 2 is adjusted to produce the desired average or mean product base thickness, and the load applied by load roll 3 is adjusted to reduce base thickness variation across the width of the product.

In such an arrangement the mold roll may be two feet or longer in length and the load applied by the pressure rolls may be as much as 1600 pounds or more per lineal inch of mold nip.

In a more complex control system 7, signals from thickness sensor 13 (or multiple sensors arranged to sense various desired control parameters) are fed into an electronic controller that contains an algorithm that controls the loading forces or roll displacements to produce a desired product. Thickness sensor 13 is, in the presently preferred embodiment, a magnetic reluctance sensor placed, as shown, to detect base layer thickness near the pressure zone. Alternatively, sensor 13 (in the form, e.g., of a beta-gauge) may be placed downstream of the mold apparatus. In some situations it is desirable to use a scanning sensor 13 that traverses the width of the product and measures variation in base thickness across the width. If load roll 3 has a sufficiently compliant surface and is adjusted to completely balance the load applied by a sufficiently stiff pressure roll 2, a stationary thickness sensor 13 measuring the thickness at one point along the width of the product may provide sufficient control feedback, due to the pressure nip gap remaining even. If the pressure roll is approximately as flexible as the mold roll, more load must be applied by the load roll to compensate for the bending of the pressure roll to maintain an even nip gap by bowing the middle of the mold roll toward the bowed pressure roll. The stacked plate structure of the mold roll, however, limits the amount of forced curvature that can be tolerated before adjacent plates of the mold roll begin to separate and cause molding flash. Extreme axial loading of the mold roll (e.g. by tie rods) can extend this limit and increase the amount of mold roll curvature that can be tolerated. Furthermore, pressure roll 2 is more readily constructed to be rigid in bending to address this condition than is the mold roll.

Figure 3:
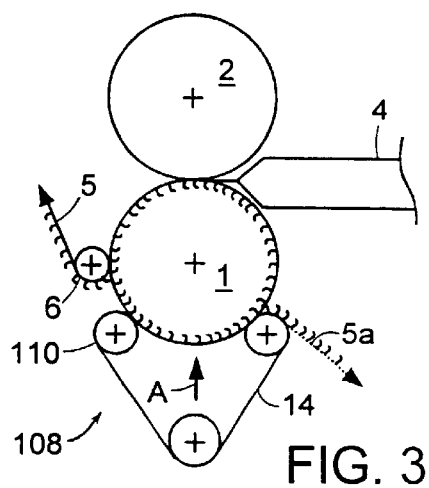
FIG. 3 shows a molding system with a load belt.

Referring to FIG. 3, in another embodiment a load belt system 108 replaces load roll 3 of FIG. 1 as the means to apply a reaction load to mold roll 1 to balance the load applied by pressure roll 2. Load belt system 108 has a load belt 14 and at least two or more rolls 110 to tension and support belt 14. Belt system 108 is loaded against mold roll 1 effectively in the plane of the axes of the mold and pressure rolls.

An advantage of using a load belt system 108 is that the contact load against mold roll 1 is spread over a very wide contact area to make the contact pressure low. In addition, by the provision of cooling fluid as suggested by arrow A, effective cooling is achievable. In the case of the arrangement shown in dashed lines in FIG. 3, contact with the cooling product occurs over a long length of travel so that even at high speed there is time to extract heat from the back side of the base layer as it passes between load belt 14 and the mold roll.

FIGS. 4–6 show a number of ways, according to the invention, to cool the molding system. To advantageously remove heat at a constant rate from either the product or mold roll 1 by a conformable load roll 3, heat is continuously extracted. Due to the relatively low thermal transfer characteristics of most durable, highly compliant materials (as compared to metals), in most instances it is preferable to transfer heat directly from the load roll surface rather than transfer it through the outer compliant layer of the load roll to an internal cooling system. Cooling the load roll also reduces the amount of heat that otherwise has to diffuse through the tooling rings or disks of the mold roll to be extracted by a heat removal means such as circulated water in the core of the mold roll. This reduces the temperature gradient between the surface of the mold roll and the cooled core of the mold roll, which, in turn, improves the assemblability of the mold roll and helps to keep the mold rings in contact with the central mold roll shaft, in part because differences in thermal expansion of the components of the mold roll are reduced due to reduced temperature gradients.

In FIG. 4, cold air is blown across the surface of the load roll from a cold air source 112. In FIG. 5 a moving cooling belt 114 is held in contact with load roll 3. Cooling water (represented by block 116) is sprayed against the back side of thermally conductive belt 114, which transfers heat from the surface of load roll 3. Belt 14 shields load roll 3 from the cooling water, helping to keep the product dry.

As shown in FIG. 6, an alternative arrangement is to run cooling belt 114 through the load roll nip. In the case where the product remains on mold roll 1 and is peeled off after passing through the load roll nip (i.e. by take-off roll 6a in FIG. 1), belt 114 is passed through the load roll nip along with the cooling product. This arrangement is particularly useful for rapid cooling of the back side of the base layer, as cooling belt 114 is held in direct contact with the product through the entire contact area of the load roll nip. Belt 114 may in turn be cooled (e.g. by water 116 or air) at some distance from the nip.

Figure 7:
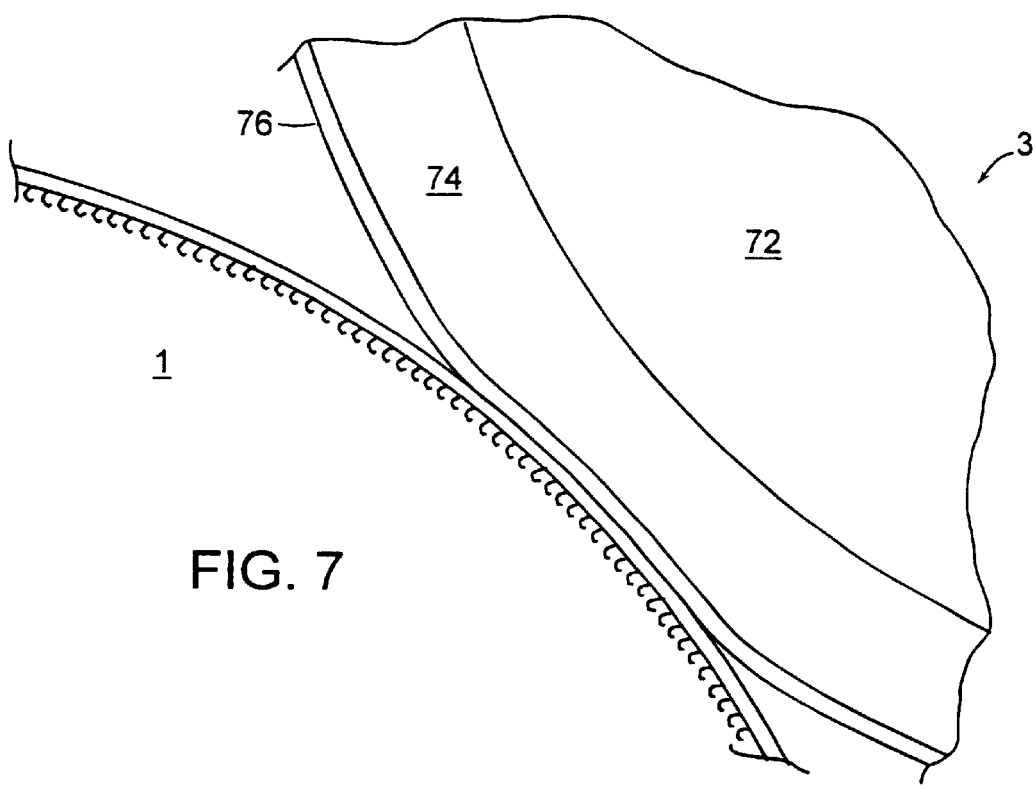
FIG. 7 is an enlarged view of the contact zone between the load roll and mold roll of FIG. 1.
Figure 7A:
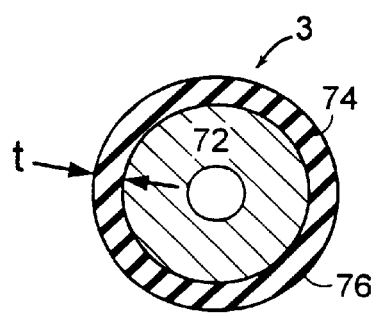
FIGS. 7A and 7B illustrate different conformable load roll constructions.

Referring to FIGS. 7 and 7A, in the presently preferred embodiment conformable load roll 3 has a stiff, relatively non-conformable core 72 (preferably steel), a compliant layer 74 (preferably an elastomer), and an outer sleeve 76 which is formed of an elastically deformable material with a hard surface, preferably either hard polymer or metal. In the present embodiment, the overall diameter of load roll 3 is about 12 inches and compliant layer 74 has a thickness t of about 0.5 inch. A suitable material for compliant layer 74 is urethane, due to its stability, its ability to be sized by grinding, and its relatively low cost. For higher temperatures, silicone rubber is also acceptable. Outer sleeve 76 preferably has a smooth exterior and has a high thermal conductivity to remove heat either out of the back side of a product with a relatively thick base layer or directly out of the mold roll itself. Under some temperature and speed conditions, sleeve 76 may be omitted.

Figure 7B:
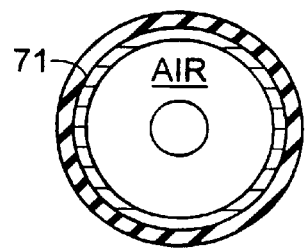

Referring to FIG. 7B, an alternative embodiment of conformable load roll 3 is pneumatically inflatable, such as an automobile tire. As in a tire, a steel reinforcement belt 71 is preferably employed to stiffen and extend the life of the load roll.

Figure 7C:
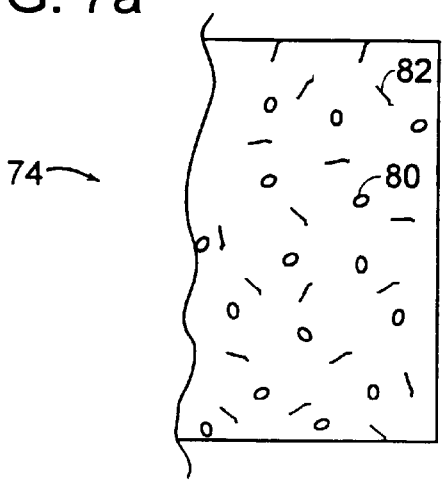
FIG. 7C is an enlarged diagrammatic view of a thermally conductive, conformable material.

Referring to FIG. 7C, in other embodiments designed to conduct heat through a compliant layer of a roll (e.g. load roll 3 of FIG. 1) particles 80 and 82 of thermally conductive materials are molded into compliant material 74. Materials such as powdered aluminum, carbon or powdered copper raise the effective thermal conductivity of a compliant layer that otherwise consists of polymers having relatively low thermal conductivity. In general, a dense distribution of a mixture of rod-shaped particles 82 and spherical particles 80 provides a higher thermal conductivity at the same volumetric loading ratio than either of the shapes alone. This construction is also useful to form the cooling belts of FIGS. 5 and 6.

Figure 8:
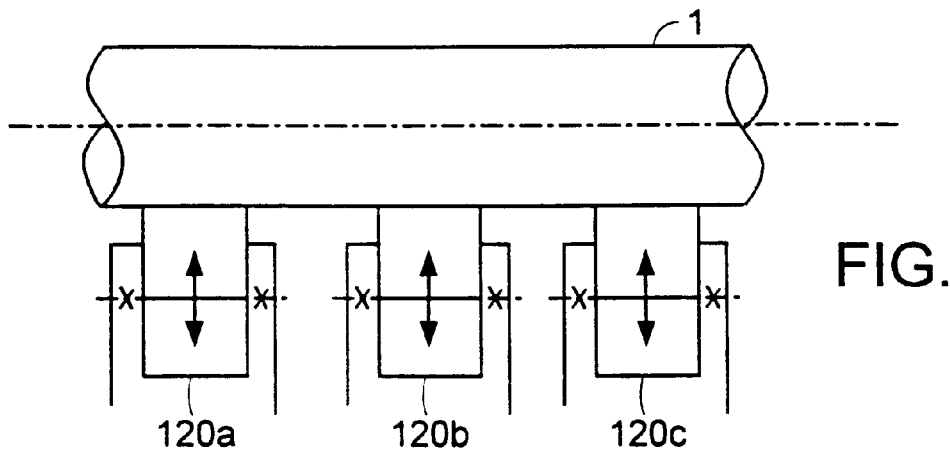
FIG. 8 illustrates the use of a series of adjustable load rolls.

The load roll 3 or 3' (or rolls 3a and 3b) of the preceding figures is (are) configured, in some embodiments, as a series of independently controllable rolls 120 arranged along the length of the mold roll, as shown in FIG. 8. Mounted on separate shafts, load rolls 120a, 120b and 120c are loaded independently against mold roll 1 to maintain a constant, even gap between the mold roll and the pressure roll to produce an even thickness product. Instead of relying on the passive conformability of the load roll to maintain gap uniformity, this embodiment enables active control of gap thickness at distinct points along the width of the product. For instance, the load roll or rolls 120 near the middle of the span of the mold roll can be employed to apply a higher load than the rolls 120 near the edges, if required to optimize or minimize the curvature of the mold roll. The configuration of FIG. 8 is particularly applicable for use with a relatively long mold roll 1 or when extremely precise gap control is required. Preferably there is at least one thickness sensor 13 (FIG. 1) associated with each load roll 120.

Figure 9:
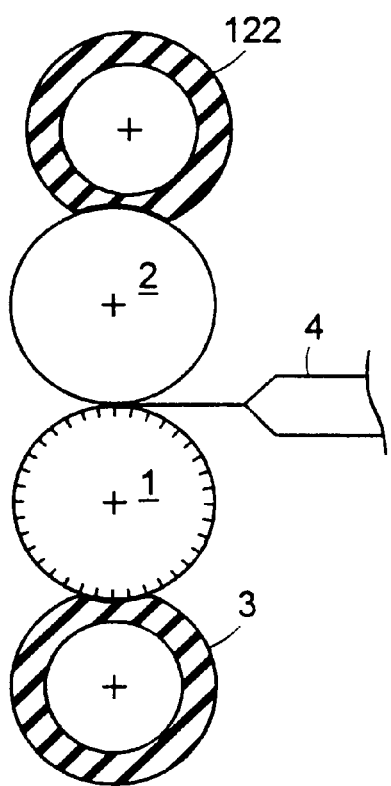
FIG. 9 shows a molding system having two conformable load rolls.

Referring to FIG. 9, in another embodiment a conformable roll 122, of similar construction to that previously discussed for load roll 3, is arranged to load against the back side of pressure roll 2 opposite mold roll 1. Conformable roll 122 maintains a desirable degree of curvature (or lack thereof) in pressure roll 2 to control the gap at the pressure zone between pressure roll 2 and mold roll 1. The compliance of conformable roll 122 reduces the chance of surface fatigue damage that might be caused by two hard rolls rolling against each other, and also allows a slight curvature of pressure roll 2 in some instances where that is desired. As shown with respect to load roll 3 in FIG. 8, conformable pressure backup roll 122 can be configured as multiple rolls 120.

Figure 10:
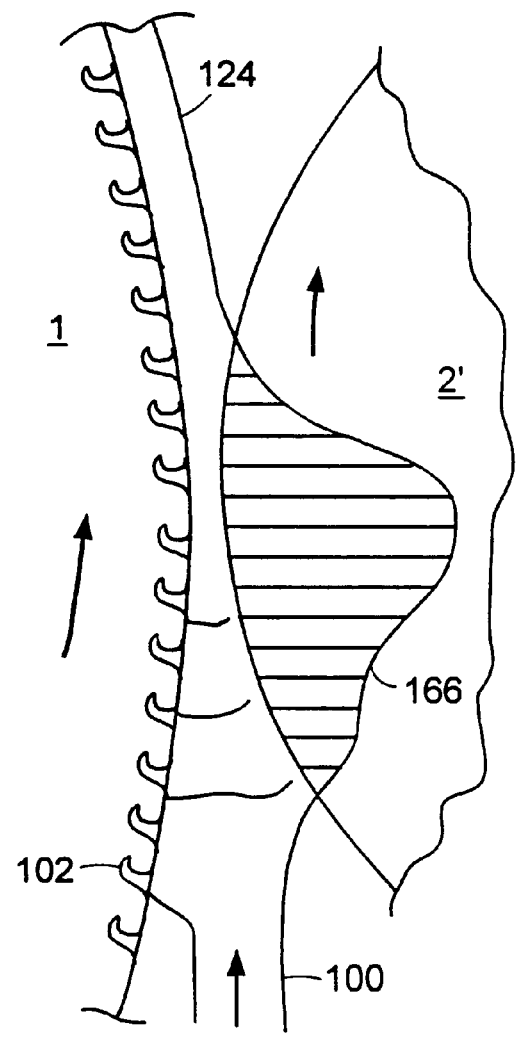
FIG. 10 is an enlarged view of the molding nip between a mold roll and a conformable pressure roll.

Referring to FIG. 10, in some embodiments it is desirable to construct pressure roll 2' with some compliance. FIG. 10 illustrates an enlarged cross section of the pressure zone between mold roll 1 (with cavities 102) and pressure roll 2', which forces melt 100 into cavities 102 and counteracts the pressure of forming base layer 124 of the molded fastener product. High pressures are developed, illustrated by pressure distribution curve 126, that push melt 100 into cavities 102. At higher production speeds the compliance of pressure roll 2' results in a wider pressure zone area, increasing the length of time that a given portion of melt is subjected to elevated molding pressures.

Figure 11:
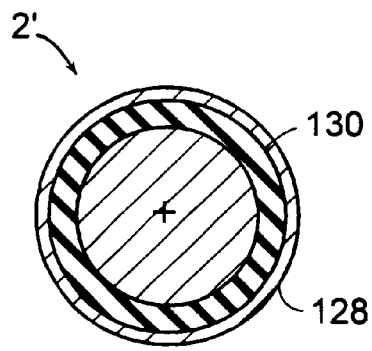
FIG. 11 illustrates a construction of the conformable pressure roll of FIG. 10.

As shown in FIG. 11, pressure roll 2' preferably has a relatively hard and rigid surface layer, such as a metal sleeve 128, covering a softer, more compliant layer 130. Compliant layer 130 in some embodiments is an elastomeric material, and in other embodiments is a fluid under pressure.

Figure 12:
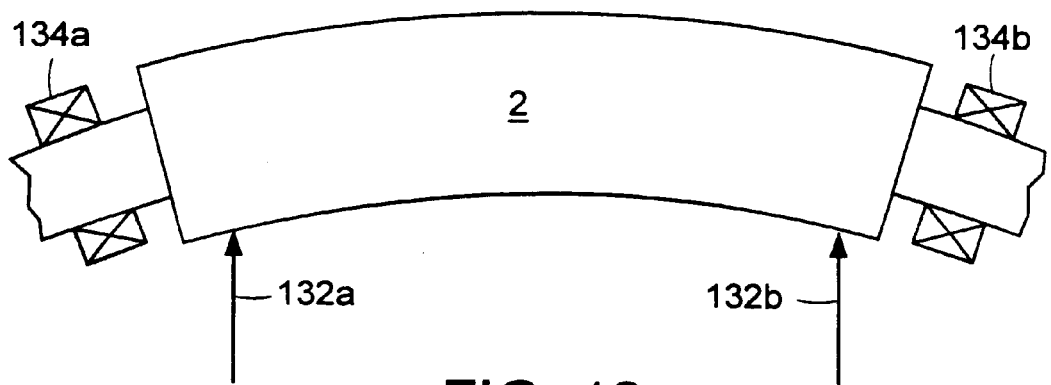
FIGS. 12 and 12A show inducing a curvature in, respectively, a solid and stacked-plate roll.
Figure 12A:
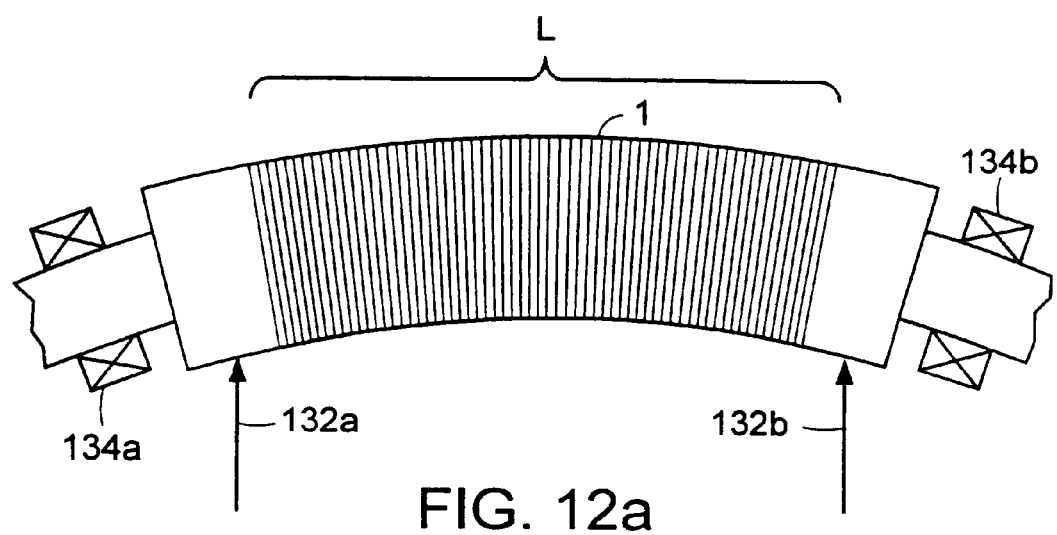

In some embodiments it is desirable to actively bend a rotating roll to create radial deflection. FIGS. 12 and 12A, for instance, illustrate a method for applying a controllable bending moment to a roll using secondary bearings or supports 132a and 132b. This is useful, for example, to deform pressure roll 2 to match the curvature of the mold roll. Spherical journal bearings that allow a small degree of angular deflection of the shaft of the roll are suitable for the outer support bearings 134a and 134b. Between outer bearings 134a and 134b, secondary supports 132a and 132b bear against the roll and produce a constant bending moment between the secondary supports. Secondary supports 132a and 132b are, in some cases, large diameter bearings that are nearly the same diameter as the central portion of the roll. In other cases fluid film bearings or other rollers are employed to bear on the surface of the roll.

FIG. 12A illustrates this bending technique employed to bend a mold roll 1 comprised of stacked plates or rings. This active bending helps provide compression between the faces of the tool rings where the melt is formed into fastener elements, squeezing the tool rings together to avoid producing molding flash between them. The molding region L of the mold roll is that part of the roll comprised of mold plates with molding cavities or which otherwise forms the molding surface of the roll.

FIGS. 13 and 13A illustrate another method and system for controlling the thickness of the molded fastener product base layer when mold roll 1 is relatively long and therefore tends to deflect under the pressure of the pressure zone. In operation, nip pressure between the two rolls tends to cause mold roll 1 to move away from pressure roll 2 in a bowed manner, causing the nip gap to be greater near the middle of the span than near the ends, forming a product base layer that is undesirably thicker at its midspan than at its edges. In order to compensate for this, the axis of pressure roll 2 is controllably skewed relative to the axis of mold roll 1, to provide a more uniform nip gap along the mold roll. Controller 90 controls the amount of skew. By proper adjustment of the skew angle a over a practical range, the gap can be made essentially constant along the length of the nip despite pressure-induced radial deflection of the mold roll.

Figure 13B:
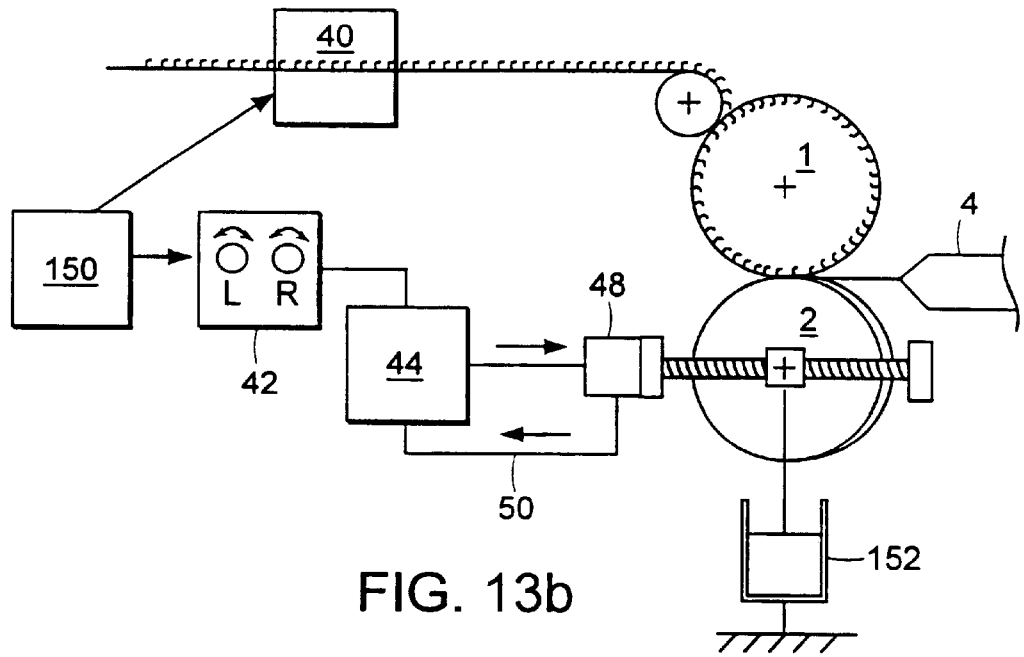
FIG. 13B illustrates an open-loop control system for skewing a pressure roll.

A control method employing an "open" control loop is illustrated in FIG. 13B. The control technique is called open-loop because the operator 150 sets the skew between the left and right sides of pressure roll 2 based on a signal from a downstream device 40. In the present configuration, device 40 is a Beta-gauge mass sensing device to sense product base layer thickness and thickness variation across the web. In operation, operator 150 adjusts left and right skew settings on control panel 42, providing the command signals to servo controller 44 which controls left and right ball screws 48. Feedback 50 from ball screws 48 to servo controller 44 informs the servo controller of the current position of the ball screws. Thus the actual skew position is closed-loop, PID (Proportional/Integral/Differential) controlled inside the servo loop, but the position set point is adjusted by an operator.

Figure 13C:
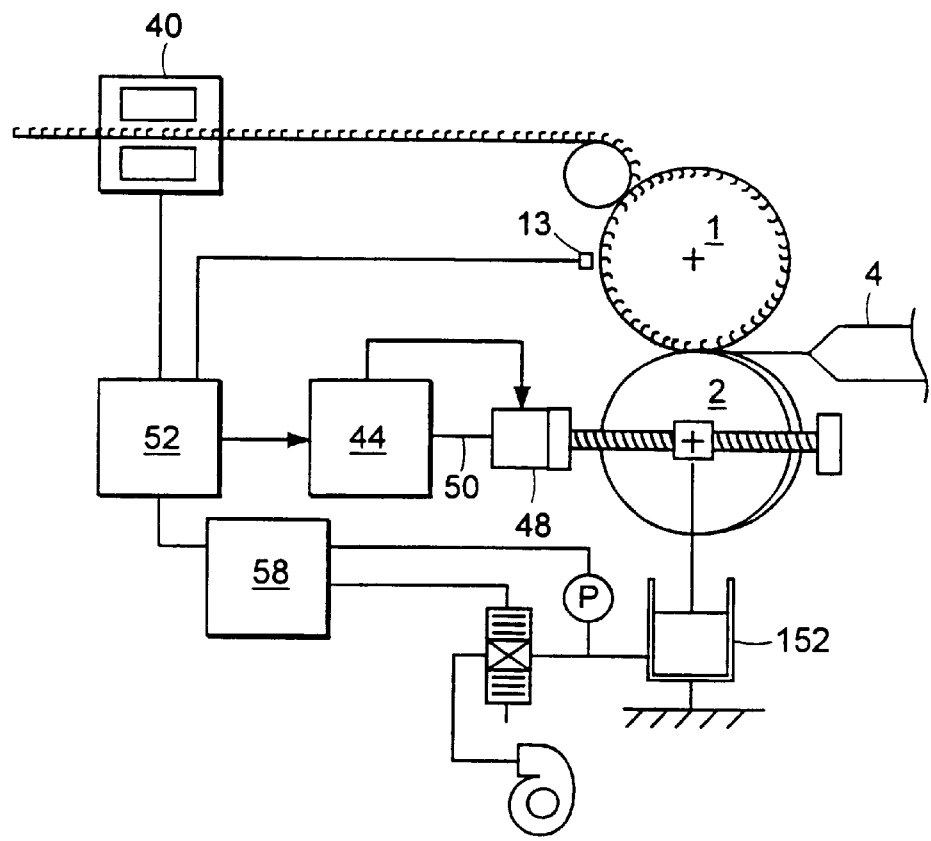
FIG. 13C illustrates a closed-loop control system for skewing and loading a pressure roll.

In another embodiment illustrated in FIG. 13C, a system controller 52 replaces the operator for closed-loop control of the system. System controller 52 determines the desired amount of skew to produce a constant base layer thickness and produces a command signal for the ball screw servo controller 44. The system controller also sends command signals to a hydraulic servo controller 58 that controls the position of left and right hydraulic load actuators 152. The hydraulic load actuators adjust the overall position of pressure roll 2 to provide a desired average base layer thickness with minimal variation from one edge to the other.

The Beta-gauge 40 is a relatively slow method of measurement. It is a scanning system which travels across the product at about 3 to 4 inches per second, and in one embodiment is located about 20 seconds downstream from the nip. The thickness feedback is therefore delayed by the time required for the product to travel to gauge 40 and by the time required for the scanning operation of the sensor. Any corrections made by controller 52 therefore need to be based on average trends to avoid instabilities caused by immediate real time correction.

Alternatively, the thickness of the base layer of the product can be sensed in close proximity to the nip, e.g. by sensor 13. Preferably sensor 13 is a non-contacting sensor (e.g. a reluctance sensor floating on a gas film bearing on the base layer), but sensing mechanisms held against the back of the product with light pressure are also suitable.

Referring to FIG. 14, a preferred embodiment provides a useful combination of control techniques, including skew control, for maintaining constant base layer thickness. Gross (average) thickness control is provided by a control system 140 controlling the normal load between mold roll 1 and load roll 3. Fine thickness control is provided by control system 142 operating actuators at each end of pressure roll 2 (to adjust for left/right unevenness) and the skew of pressure roll 2 (to adjust for middle/edge unevenness). Such combinations are useful when skewing alone requires impractically large skew angles. By compensating for most variation with gross variation control system 140, skewing is only necessary for fine control for automated trimming of thickness across the width of the product.

Referring to FIG. 15, a cooling belt 160, similar to the belt 114 shown in FIGS. 5 and 6, is useful in some embodiments to cool and support the fastener product through the continuous molding process. As illustrated, belt 160 is introduced to the nip between mold roll 1 and pressure roll 2 along with the melt 100. Belt 160 remains in contact with the cooling product as it is carried about the mold roll, helping to draw heat out of the base layer and maintaining continuous pressure against the back side of the product. The belt continues through the second nip, between load roll 3 and mold roll 1, and provides additional support for the product as it is peeled off of the mold roll by take-off roll 6. After passing through a third nip between load roll 3 and knockdown roll 162, belt 160 is peeled away from product 5.

The embodiment of FIG. 15 is particularly useful for very fast production speeds, as the prolonged contact between the product and belt 160 helps to cool the base layer, so that the product can be quickly peeled from the mold, without sufficiently cooling the fastener elements to the point that they can no longer be easily deformed for removal from the mold cavities.

Figure 16:
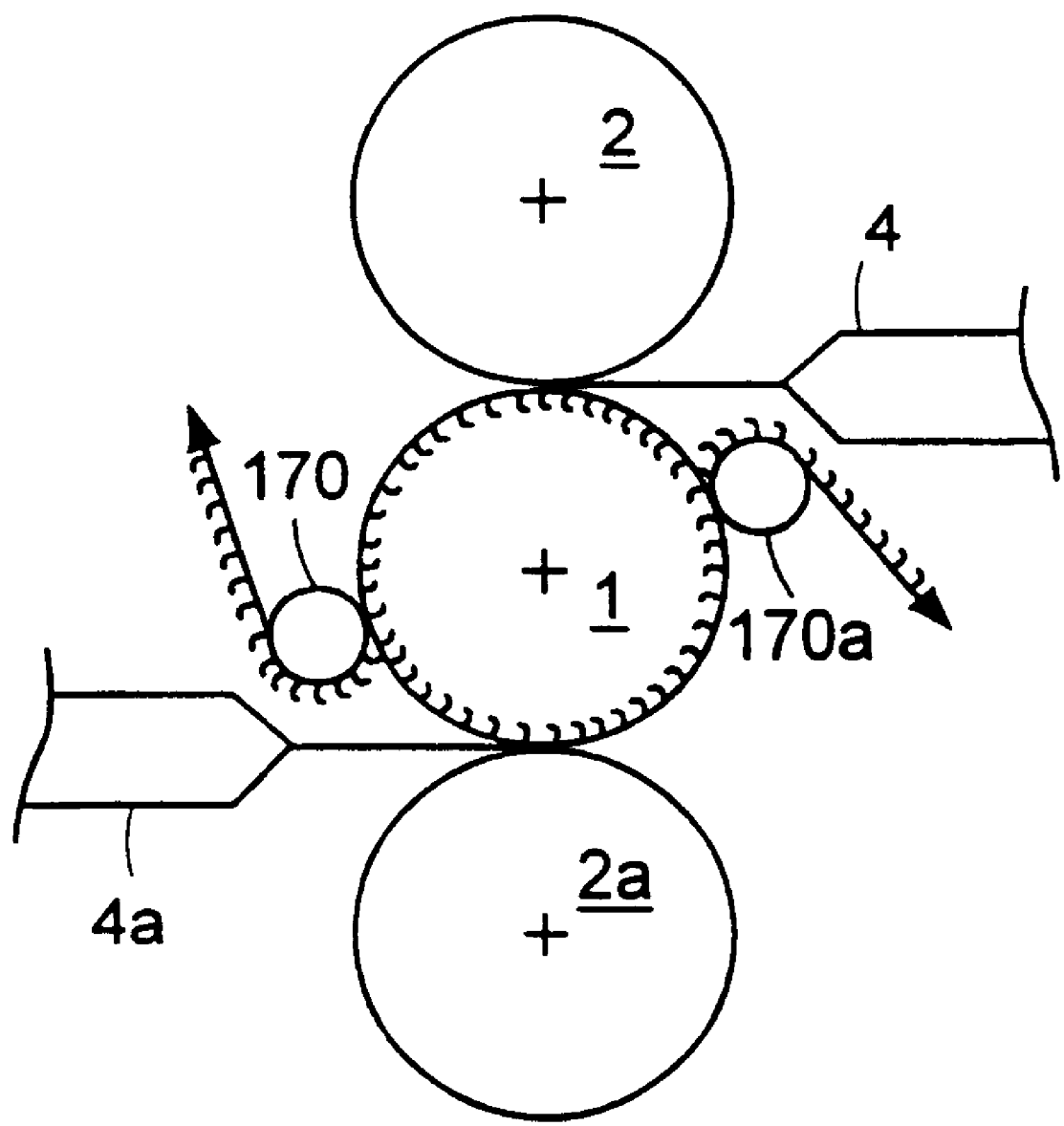
FIG. 16 shows a twin molding nip arrangement, according to the invention.

Referring to FIG. 16, in some particularly useful embodiments two continuous streams of fastener product are simultaneously manufactured with a single mold roll. Mold roll 1 is arranged between pressure rolls 2 and 2a, defining two pressure zones. Twin extruders 4 and 4a supply molten resin to the two pressure zones, and the molded product is peeled away from mold roll 1 by two take-off rolls 170 and 170a. Arranging the axes of mold roll 1 and pressure rolls 2 and 2a to lie in substantially the same plane balances the nip pressure loads exerted on mold roll 1, greatly reducing the tendency of the mold roll to bend. Any of the methods previously discussed may be employed, if necessary, to reduce bending of pressure rolls 2 and 2a or to otherwise maintain the evenness of the pressure zone gaps. Belt systems 108, as illustrated in FIG. 3, are useful in place of hard or compliant pressure rolls.

One of the advantages of having two, balanced pressure zones on the same roll, as shown in FIG. 16, is that the amount of product producible from a single mold roll can be significantly increased. Another advantage is that the loads on the mold roll are balanced, enabling less expensive mold roll structures with lower stiffness requirements. Yet another advantage is that it enables the production of wider fastener products (i.e. by allowing the use of longer mold rolls) without compromising the evenness of product base layer thickness or product quality.

Figure 17:
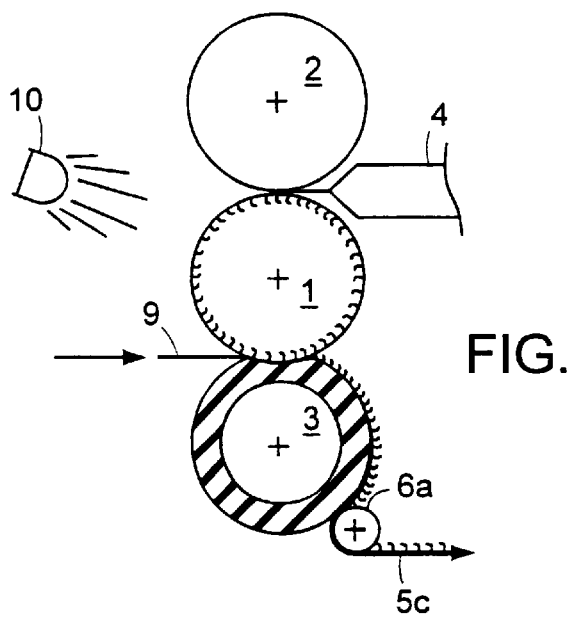
FIGS. 17, 17A and 18 through 21 illustrate methods and systems for forming a laminate product.

Referring to FIG. 17, in some useful embodiments an added material 9 is introduced to a second nip between mold roll 1 and load roll 3 to form a laminate product 5c with molded fastener elements on one side and added material 9 on the other. It is advantageous that this is done on the mold roll while the fastener elements remain protected from laminating pressure by remaining in their respective cavities. Preceding the laminating action the back side of the fastener product is re-softened, if necessary, by a heat source 10 to enhance the adherence of the base layer to the added material 9 in the second nip. Added material 9 is introduced with the molded fastener product into the second nip, which in some embodiments is defined by a compliant load roll 3. Following the laminating nip, the molded product is carried around a substantial arc of the mold roll and cools to the appropriate temperature to set the bond to the added material. The resulting laminate is removed from the mold roll by a take-off roll 6a. By bonding the added material to the fastener product while the latter is still being carried on the mold roll, the laminate is formed with the base layer advantageously in a heat-softened, clean condition, resulting in a sound bond. The freshly molded base layer provides a very good surface for adhering the added material to form a laminate. In addition, the product base layer is substantially supported between fastener elements by the surface of the mold roll, allowing higher local laminating pressures to be employed without deforming the fastener elements. This arrangement enables the laminating of fastener products with relatively thick added materials that are very difficult to pass through the pressure zone (i.e. between mold roll 1 and pressure roll 2) without disrupting the molding process.

Figure 17A:
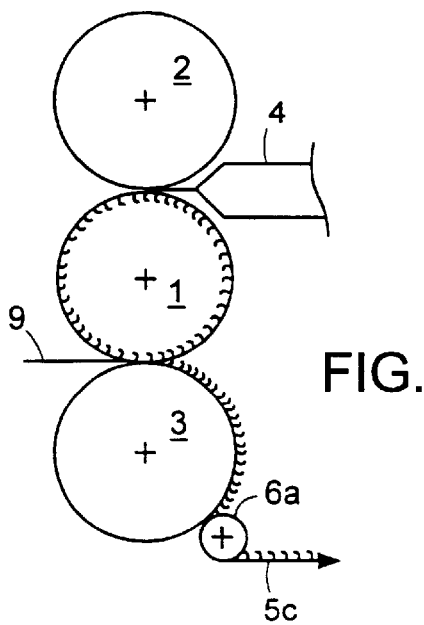

The embodiment of FIG. 17A is similar to that of FIG. 17 except that the load roll 3 that provides the nip where lamination is performed is a hard roll instead of a compliant one.

Examples of laminate products that are suitable to being formed in this manner include carpets and wall coverings. The second nip (laminating nip) may be maintained at more suitable temperatures and/or pressures to prevent damaging such products that would not reliably withstand passage through the molding nip. Furthermore, the conformability of load roll 3 helps to protect relatively delicate surface formations (of, e.g., a wall covering) from undesirable deformation during laminating.

Figure 18:
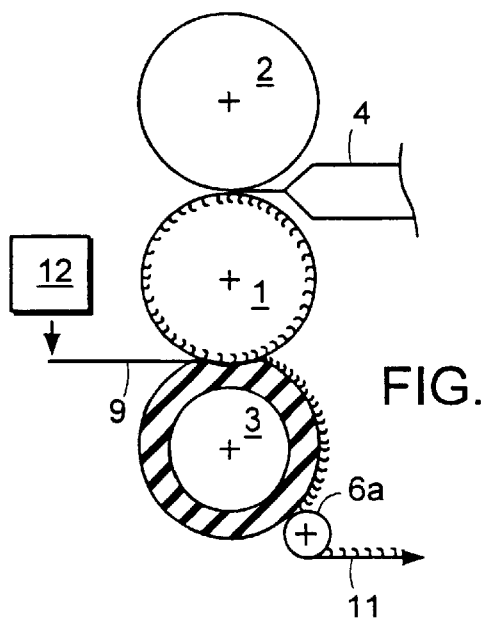

Referring to FIG. 18, other methods of bonding added material 9 to form a laminate material 11 with a molded fastener product include the application of an adhesive with an applicator 12. Suitable methods for applying the adhesive include spraying it directly on added material 9 or the back side of the unlaminated base layer prior to the laminating nip, coating the side of added material 9 with a film layer of adhesive in a previous process, rolling, doctoring and the like.

Figure 19:
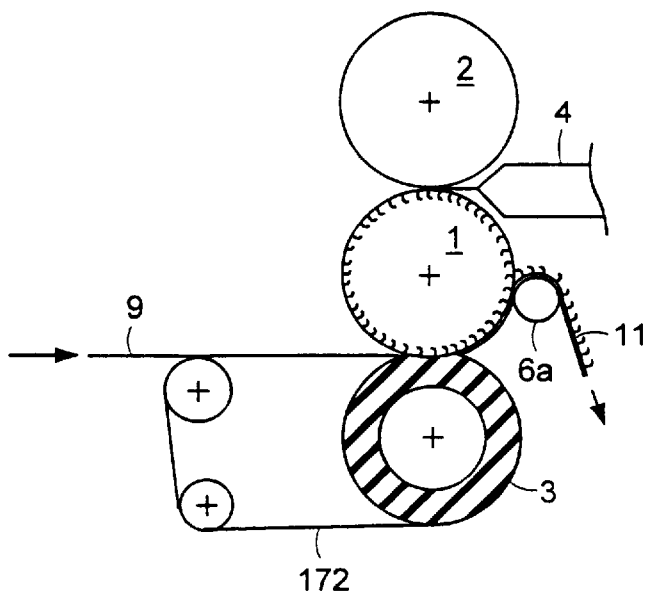

FIG. 19 shows a variation to the lamination method employing a belt 172 that carries added material 9 into and through the laminating nip between load roll 3 and mold roll 1. Belt 172 provides extra support for the added material on the way into the nip and also can provide either heating or cooling, depending upon whether the belt is heated or cooled. In some embodiments the belt surface is metallic and of different consistency from the compliant layer on the load roll. This machine and process is useful for laminating heavy web materials such as floor mat material and the like.

Figure 20:
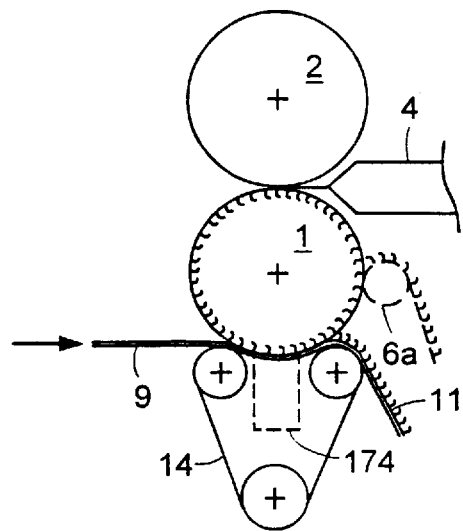

FIG. 20 shows another arrangement useful for forming a laminate product, employing a belt system 108 (as in FIG. 3) to provide laminating pressure. Belt system 108 conducts a belt 14 in close contact with mold roll 1. Both the belt and its roller system are forced up against the mold roll to provide sufficient pressure for lamination. This method is most advantageous for laminations requiring a long time (i.e. a wide contact area in this embodiment) for proper bonding. Another advantage of employing a belt system to provide lamination pressure is that microscopic scuffing of a compliant roll against a hard surface that might damage delicate laminate materials, such as paper or vinyl wall coverings, is avoided, without the high contact pressures of a hard load roll. The laminated product is either removed with the belt system or is carried further about the mold roll and peeled off by a separate take-off roll 6a. An optional cooling system is illustrated by box 174.

Figure 21:
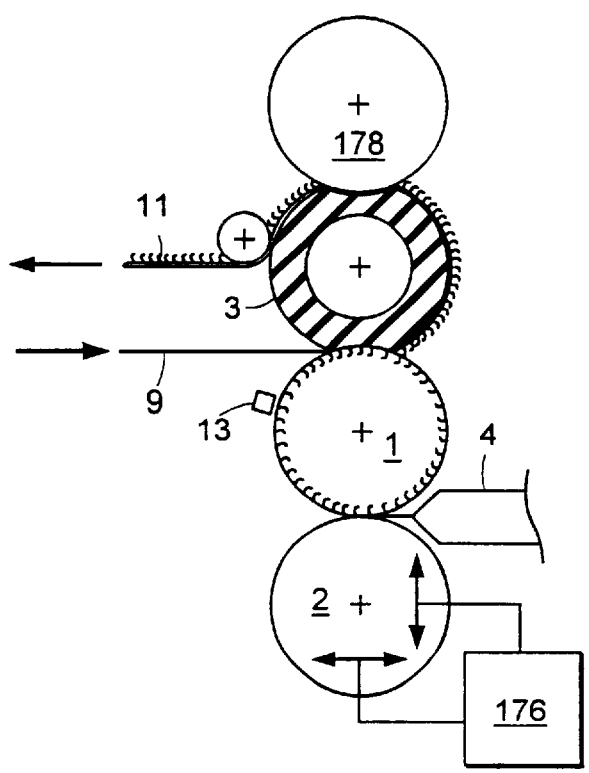

FIG. 21 shows a combination of thickness control and lamination. A skew-controlled pressure roll 2 and controller 176 maintain a constant thickness of molded product base layer. As described in previous embodiments, load roll 3 compensates for the load applied by pressure roll 2, minimizing the bending of the mold roll and thereby minimizing the amount of pressure roll skew necessary to maintain constant base layer thickness. In addition, a second load roll 178 bears against load roll 3, helping to maintain the straightness of load roll 3 and also providing an additional pressure nip through which the laminate is trained for improved bonding.

Figure 22:
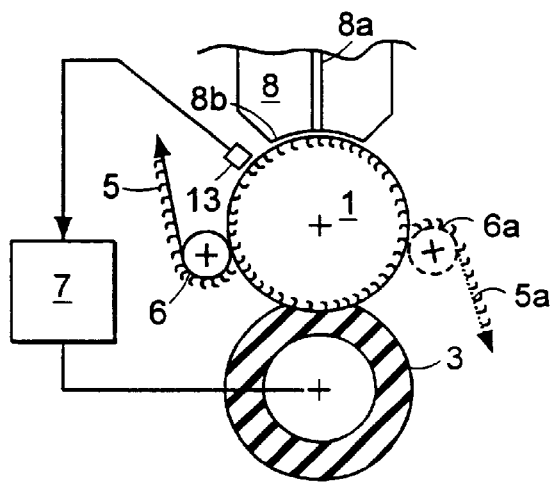
FIGS. 22 and 23 illustrate systems employing a pressure head and a conformable loading system.
Figure 23:
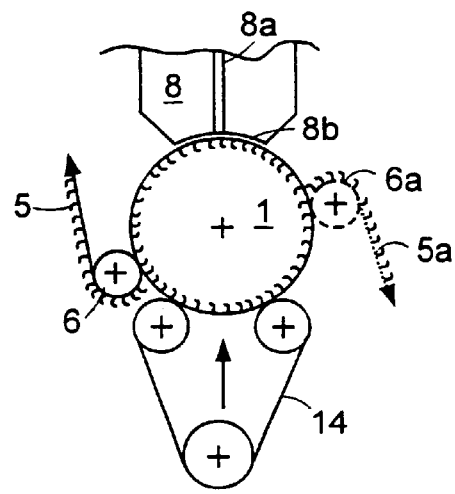
Figure 24:
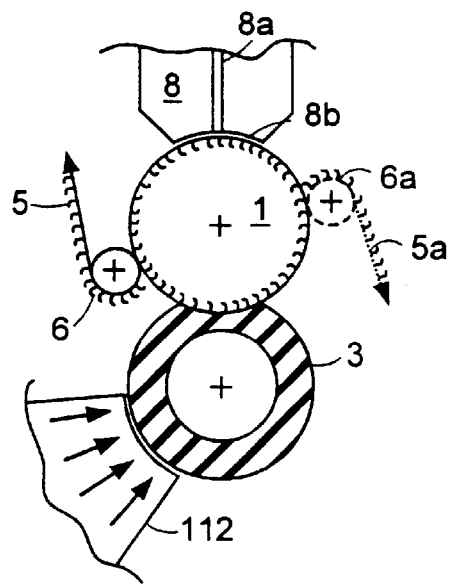
FIG. 24 shows a system with a pressure head and a cooled, conformable load roll.

FIGS. 22–29 illustrate other configurations, equally as useful as those thus far described, that employ a pressure head 8 fed by an extruder or other source of pressurized molten polymer resin to both introduce the molten resin that will form the molded fastener product and to apply the pressure necessary to force the resin into the fastener-shaped mold cavities. As illustrated by the common reference numbers in these figures and earlier figures, other components of the systems that employ a pressure head 8 are essentially the same as those employing a pressure roll 2. These additional figures show that the novel features described with reference to a system with a pressure roll apply equally as well to a system with the pressure head 8. In this respect, the previous descriptions of the figures to which FIGS. 22–29 correspond are also applicable to these embodiments. FIG. 22 corresponds to FIG. 1, FIG. 23 to FIG. 3, FIG. 24 to FIG. 4, FIG. 27 to FIG. 16, FIG. 28 to FIGS. 17, 18 and 19, and FIG. 29 to FIG. 20. From these examples it should be evident that any of the other embodiments heretofore disclosed may be adapted to employ a pressure head.

Pressure head 8 in FIGS. 22–29 comprises an extruder nozzle assembly fed by an extruder (not shown). In nozzle throat 8a a sheet form flow of polymer is produced, which is applied to the mold roll 1. Shoe surfaces 8b of the nozzle assembly that conform to the curvature of the roll serve to maintain the extruder pressure against the roll and to define the gap with the mold roll that defines the thickness of the base layer of the product. Pressure head 8 thus forces the polymer into the mold cavities in mold roll 1 and forms a sheet-form film or base layer of polymer on the surface of the mold roll. As in the previous embodiments, the polymer is forced into the mold cavities to form fastener elements or the like under the high pressure of the pressure zone. The pressure zone forces tend to bend the mold roll away from the pressure head and are resisted by the methods described above (with, e.g. a compliant load roll 3 as in FIG. 22 or a belt system 108 as in FIG. 23) to maintain an even gap for forming the base layer of the fastener product.

Figure 25:
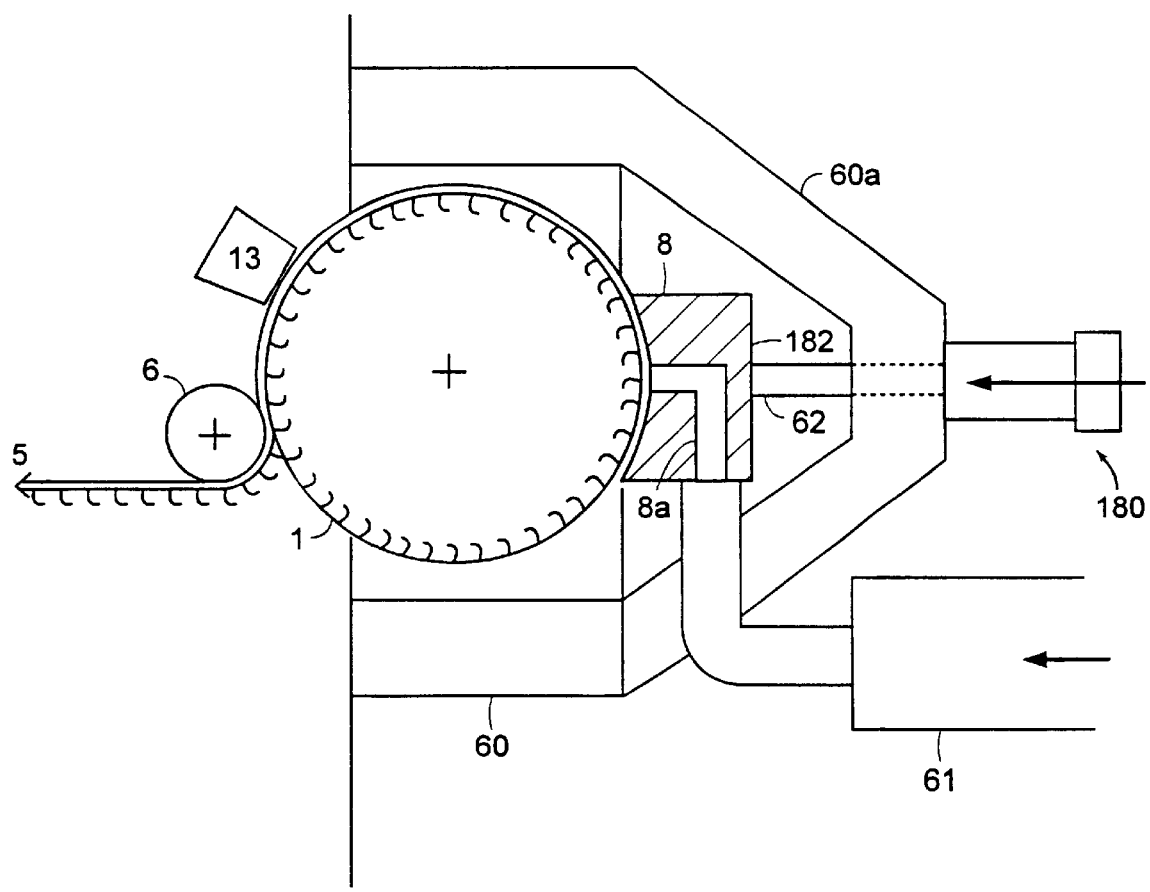
FIGS. 25 and 26 show control systems for systems with pressure heads.

Referring to FIG. 25, an arrangement for controlling the gap between mold roll 1 and pressure head 8 actively adjusts the shape and position of the pressure head relative to the mold roll. This can be done, for instance, in response to thickness sensor 13. The axis of mold roll 1 is supported on suitable bearings (not shown) in a load frame 60. An extension 60a of load frame 60 supports a head loading system 180 (e.g. a number of hydraulic cylinders or ball screw actuators arranged along the length of the pressure head). Molten polymer resin is supplied by a melt source or extruder 61 to head 8 under pressure. Head loading system 180 loads head 8, by shafts 62, against mold roll 1 through a film of molten resin, thereby maintaining a controllably constant gap between mold roll 1 and head 8 for forming the base layer of the fastener product 5.

For active bending of the pressure head 8 to contour the surface of the pressure head along its length to conform to the surface geometry of the bent mold roll, other means of bending pressure head 8 include a number of tie bolts between the molding head and frame 60, arranged along the length of the pressure head, that are axially adjusted either by rotating a threaded member or by controlled thermal expansion (i.e. changing the net length of the tie bolts by changing their temperature). Adjusting the lengths of individual tie bolts induces bending moments in pressure head 8 that causes its curved surface 182 to also bend along its length to conform to the curvature of the mold roll.

Under some circumstances it is desirable for mold roll 1 to be slightly elastically bent away from pressure head 8 (or pressure roll 2) by pressure zone forces to increase the axial compression between the stacked mold plates that form the mold roll in the vicinity of the high pressure zone. This can reduce the tendency of the molten resin to form flash between the mold plates. In these instances it is advantageous to have some intentional bending of the mold roll away from the pressure source, and to force the pressure mechanism (e.g., pressure head 8 or pressure roll 2) to follow that curvature in order to maintain the uniformity of the gap and of the product. Referring further to FIG. 25, the load system 180, comprised of several loading rods 62 distributed along the length of the pressure head, forces head 8 toward mold roll 1 near its midspan to compensate for the curvature of the mold roll. Rods 62 are individually controlled by a control system to locally force pressure head 8 toward or away from mold roll 1 to maintain the desired gap. This technique is particularly useful to mold extremely wide widths of product by compensating for the increased bending of relatively longer rolls subjected to higher overall mold pressure forces.

In some instances it is desirable not to have a perfectly even gap across the width of the pressure zone. For instance, in some cases it is desirable to have the gap slightly smaller toward the edges than in the middle, for example when there tends to be some leakage of polymer material from the edges of the pressure zone.

Figure 26:
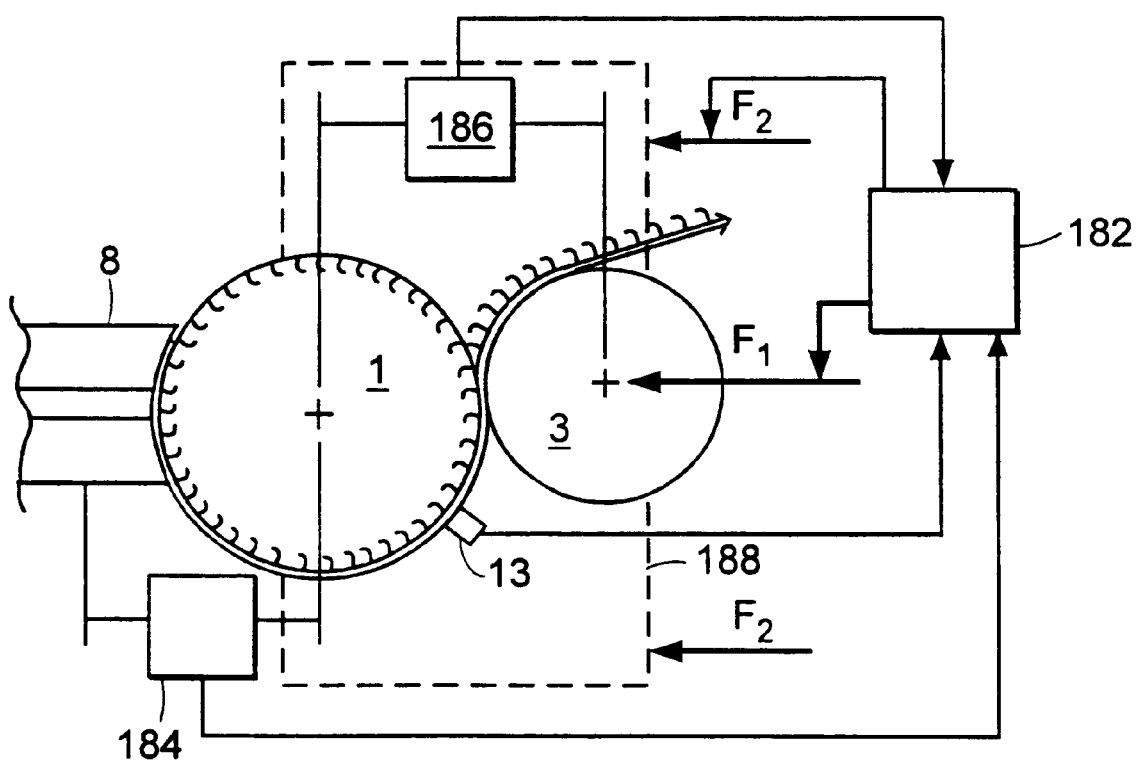

Referring to FIG. 26, use of a load roll 3 with a pressure head 8 is presently preferred to avoid extreme mold roll curvature in situations where the flatness of the product is critical. Molding the product on a bowed mold roll results in a base layer that has a degree of complex curvature, even after being spooled. In some cases such a curvature is desirable, but in others it is not. Some preferred embodiments therefore employ both pressure head curvature control and a load roll on the side of the mold roll opposite the pressure head. Controller 182 controls the relative positions of load roll 3 and pressure head 8 with respect to mold roll 1. Displacement transducers 184 and 186 and thickness sensor 13 provide feedback. In the embodiment shown, controller 182 controls force $F_2$ which loads frame 188, to which both mold roll 1 and load roll 3 are mounted, toward head 8. In addition, controller 182 controls force $F_1$ which forces load roll 3 against mold roll 1.

As shown in FIG. 27, a particularly advantageous embodiment employs two relatively stiff pressure heads 8 supplying molten resin to two pressure zones on opposite sides of a single mold roll 1. This produces two continuous streams of product 5 and 5' that are peeled from mold roll 1 by take-off rolls 6 and 6', respectively. For the reasons already described, extremely wide widths of a thin, even product are thus moldable, due to the balance of forces acting on relatively long mold roll 1.

Figure 30A:
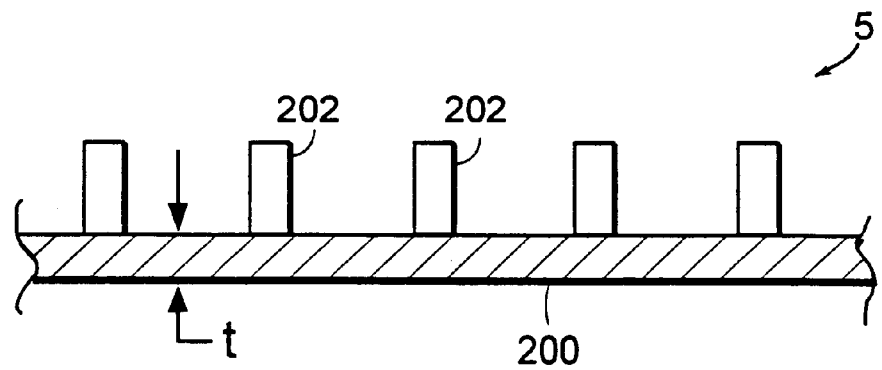
FIGS. 30A through 30C illustrate cross-sections of fastener products.
Figure 30B:
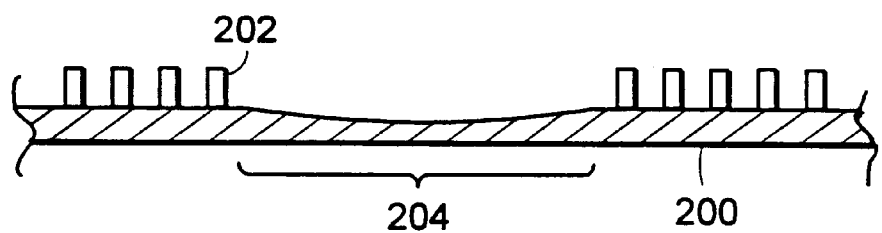
Figure 30C:
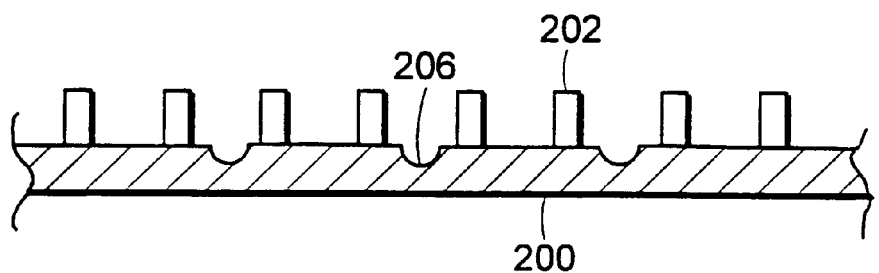

FIGS. 30A–30C illustrate some of the web base thickness profiles that can be maintained by the apparatus and method of the present invention, shown in cross-section across a portion of the length of the mold roll. In FIG. 30A, fastener product 5 has a base web 200 and multiple upstanding fastener elements 202. Maintaining the thickness of the mold gap that forms base web 200 along its length produces a product 5 with a base web 200 of generally consistent thickness t. In another embodiment, shown in FIG. 30B, tapered regions 204 are provided in the predetermined profile of base web 200. In some cases, grooves 206 or other indentations are formed in base web 200, as shown in FIG. 30C. These and other profiles are advantageously maintained at their predetermined thicknesses by maintaining the profile of the mold gap as described above.

Figure 31:
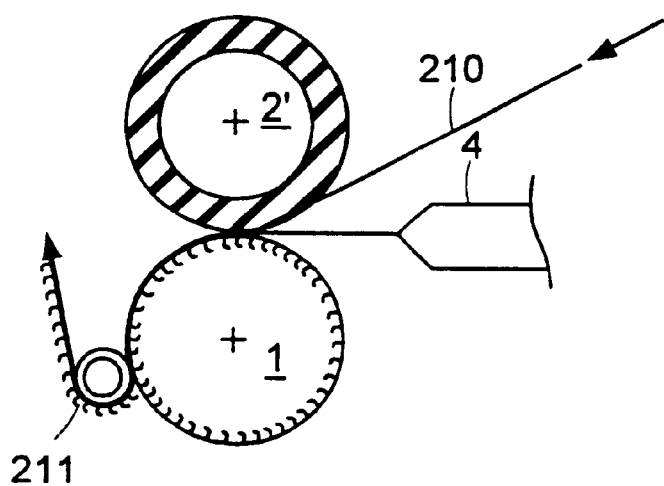
FIG. 31 shows an embodiment useful for molding fastener elements on a backing material.

Referring to FIG. 31, in another embodiment a compliant pressure roll 2' is employed to protect surface features on the surface of a sheet material 210 introduced to the molding nip between pressure roll 2' and mold roll 1. These surface features would tend to be damaged by being passed through a nip formed by two non-conformable rolls. Hard surface features can also damage non-conformable roll surfaces. This arrangement is particularly useful, according to the invention, for continuous molding of fastener elements on one side of a sandpaper product having surface features consisting of grains of sand or other abrasive particles adhered to one broad surface of the paper. It is also useful for molding fastener elements on wide sheets of material having delicate surface features, such as fibers or embossed features, that could be damaged by the extreme pressures of the molding nip. Examples of these types of materials include upholstery material with leatherette-grained surfaces and grass-paper wall coverings. After molding, the finished product is pulled from the mold cavities of mold roll 1 about a take-off roll 211, which also has a compliant outer surface.

Figure 32:
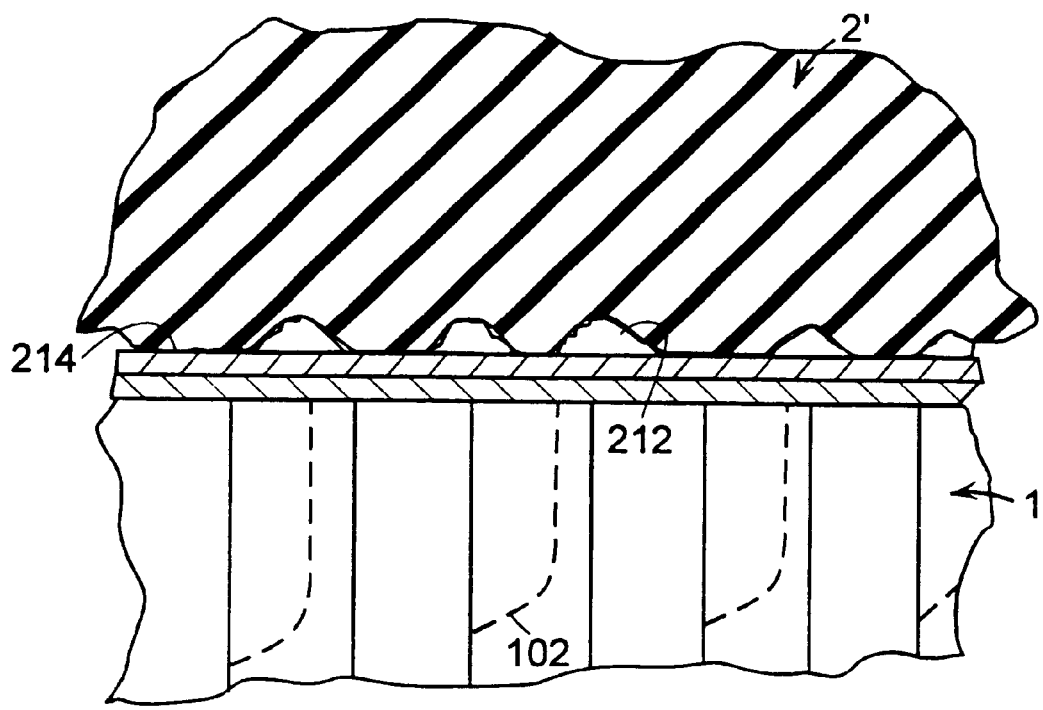
FIG. 32 is an enlarged view of part of the nip of FIG. 31, illustrating an effect of a compliant pressure roll.

FIG. 32, looking in the direction of the flow of material through the mold nip between compliant pressure roll 2' and mold roll 1, illustrates the deformation of the surface of the pressure roll in the vicinity of abrasive grains 212 as a sandpaper product 214 is passed through the nip. Abrasive grains 212 are quite small in most commercial sandpapers, which have grades from 30 to over 600 for fine polishing applications. The compliant surface of pressure roll 2', preferably of an elastomeric material of 60 to 70 durometer for use with a medium-grit sandpaper, conforms to encapsulate the grains 212 and distribute pressure around the grains. Because there is effectively no surface speed differential between rolls 1 and 2', grains 212 do not abrade the elastomeric surface of roll 2'. The resulting abrasive product is "in situ laminated" to fastener elements such as hooks for hook to loop fastening. In other words, the forming of the base web integral with fastener elements and the lamination of the base web and abrasive paper occur simultaneously in the nip. The resin of the base web is laminated to the back of the sandpaper to provide a means for fastening the sandpaper to a sanding block or other sanding device.

Figure 33:
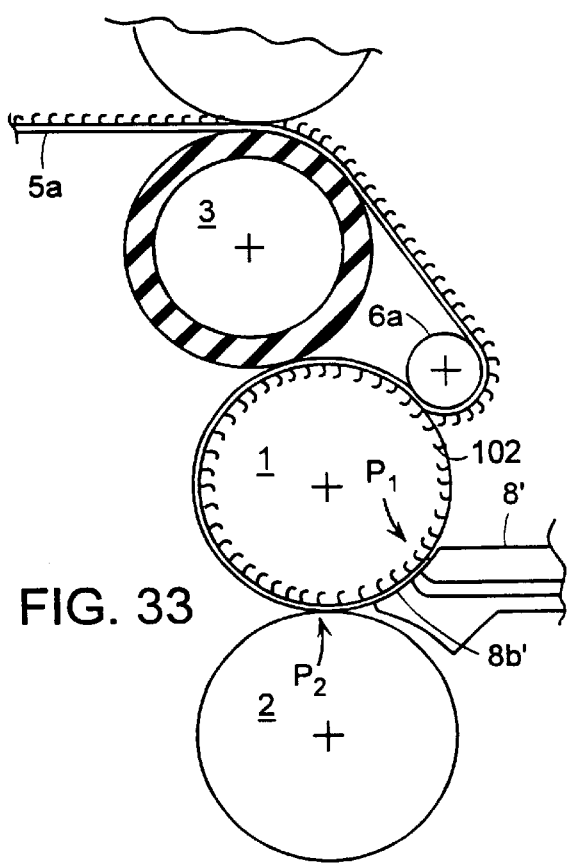
FIGS. 33 and 34 illustrate systems employing a pressure roll and a pressure head.

Referring to the molding system of FIG. 33, in some cases the system has both a pressure head 8' and a pressure roll 2. The pressure head 8' preferably applies sufficient pressure in pressure zone $P_1$ to partially fill the fastener element cavities in mold roll 1 and provide a layer of resin on the exterior of the mold roll. Pressure roll 2 provides a second application of pressure against the resin in another pressure zone $P_2$, with the resin still in a formable condition, to complete the filling of the cavities in the mold roll and produce a base web with even thickness. Surface 8b' of pressure head 8' is curved to match the curvature of the mold roll. For molding systems with two pressure zones $P_1$ and $P_2$, support roll 3 is preferably arranged to counteract the loads against the mold roll from both pressure zones (i.e., the three rolls 1, 2 and 3 do not lie in a single plane). By applying the resin directly against the mold roll, temperature variations and edge shrinkage can be minimized while, by subsequently employing the pressure roll, uniform filling of the mold cavities can be assured under, e.g., high speed conditions.

Figure 34:
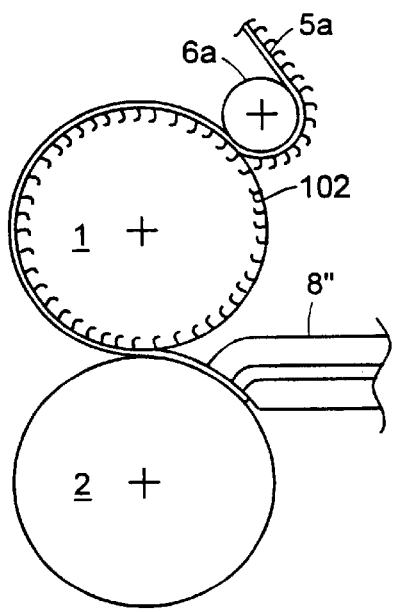

Referring to FIG. 34, in some instances a pressure head 8'' extrudes resin directly onto the surface of a pressure roll 2. The extruded resin enters the nip between pressure roll 2 and mold roll 1 where it is forced under nip pressure to fill the cavities in the mold roll. In this case it is not necessary, in most situations, for the pressure head 8'' to apply substantial pressure, and therefore the three rolls 1, 2 and 3 are preferably coplanar.

Figure 35:
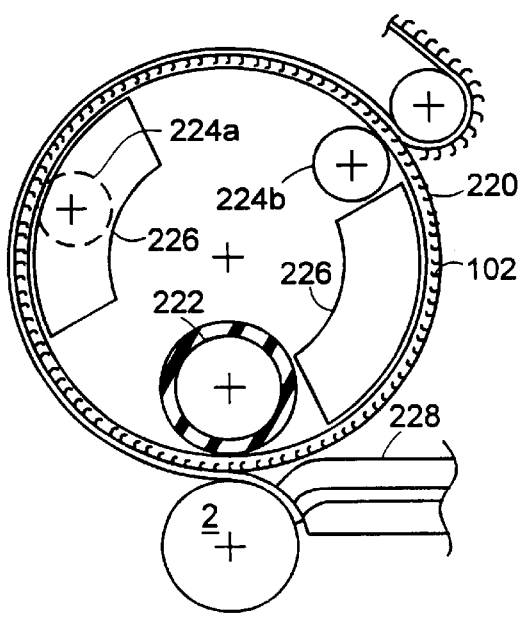
FIG. 35 shows a system with a mold hoop.

Referring to FIG. 35, another molding system employs a mold hoop 220 with fastener element cavities formed in its outer surface. The mold hoop is held against pressure roll 2 with a loading roll 222, forming a molding nip and pressure zone between hoop 220 and roll 2. Loading roll 222 preferably has a conformable surface, as described above with reference to FIG. 1. Additional rolls 224a and 224b provide additional support for hoop 220, which is driven by rotating rolls 2 and 222. The relatively large diameter of hoop 220 provides room within the hoop for cooling systems 226 for cooling the hoop. This arrangement is particularly suitable for molding conditions that require the cooling fastener elements to remain in their cavities for an extended length of time for sufficient cooling, or to enable relatively fast line speeds. A pressure head 228 is shown supplying molten resin to the nip. Alternatively an extruder 4, as shown in FIG. 1, can be employed. Hoop 220 is preferably of metal.

What is claimed is:

1. A method for continuously molding fastener elements integral with a base web from a flowable resin, the method comprising providing a cylindrical mold roll rotatable about an axis of rotation and defining an array of fastener element-shaped mold cavities in a peripheral surface thereof; and applying operating pressure to force resin into said cavities at a mold gap defined adjacent the peripheral surface of the mold roll, to form said fastener elements, while supporting the mold roll with a support member on the side of said mold roll generally opposite the mold gap, the support member arranged to apply a force to the mold roll along its peripheral surface for resisting radial deflection of the mold roll caused by said operating pressure, to maintain the mold gap at a desired thickness profile across the width of the base web under said operating pressure.

2. The method of claim 1 in which the mold roll defines a molding region longer than about 12 inches to produce a correspondingly wide web.

3. The method of claim 1 in which the pressure applying means is capable of applying load to said mold roll in the range of about 1000 to 1600 pounds per lineal inch along said mold roll.

4. The method of claim 1 in which said mold roll comprises an axially arranged stack of a large multiplicity of disks, at least many of which have mold cavities at their peripheral surfaces.

5. The method of claim 1 in which said means to maintain the mold gap comprises a moving support member on the side of said mold roll generally opposite said pressure-applying means, said support member disposed to engage the peripheral surface of the mold roll with sufficient force to resist radial deflection of said mold roll.

6. The method of claim 5 in which said pressure-applying means comprises a pressure roll, the mold gap comprising a nip between the mold roll and the pressure roll.

7. The method of claim 5 in which said pressure-applying means comprises a nozzle assembly for introducing said resin to the pressure zone under pressure, the mold gap comprising a gap between said nozzle assembly and the mold roll.

8. The method of claim 5 further comprising means to extract heat from the surface of the support member to cool the support member.

9. The method of claim 1 further comprising a support member controller adapted to vary the force applied to the peripheral surface of the mold roll by the support member in response to operating conditions.

10. The method of claim 9 further comprising a sensor adapted to provide operating condition information to the support member controller.

11. The method of claim 10 in which the sensor is constructed to detect the presence of molded resin on the peripheral surface of the mold roll, the controller being constructed to unload the support member from the peripheral surface of the mold roll when resin is not present.

12. The method of claim 10 in which the sensor is constructed to respond to a condition of the apparatus that is related to the pressure in the mold gap.

13. The method of claim 1 in which the depth of the mold cavities from the surface of the mold roll is between about 0.004 and 0.035 inch.

14. The method of claim 13 in which the depth of the mold cavities is between about 0.006 and 0.012 inch.

15. The method of claim 1 in which the cavities are shaped to form functional fastener elements which comprise hook elements constructed to engage fibers.

16. The method of claim 1 in which the mold cavities at least partially define the shape of hook elements, each element having a stem portion and at least one head portion that projects to a side of said stem portion.

17. The method of claim 1 in which the support member has a peripheral surface that is resiliently deformable for conforming generally to the peripheral surface of the mold roll.

18. The method of claim 1 in which the support member has a surface of a resilient substance that directly contacts the peripheral surface of the mold roll.

19. The method of claim 18 in which said portion is of an elastomeric material.

20. The method of claim 1 in which the support member comprises a generally cylindrical roll arranged to rotate about an axis.

21. The method of claim 1 in which the support member comprises a supported belt arranged to apply force to the mold roll.

22. The method of claim 1 in which said operating pressure is applied by a pressure roll defining, together with the mold roll, the mold gap.

23. The method of claim 1 in which said operating pressure is applied by a nozzle assembly adapted to introduce said resin to the mold gap under pressure, said mold gap comprising a gap between said nozzle assembly and the mold roll.

24. The method of claim 1 in which said operating pressure is simultaneously applied at first and second mold gaps disposed on opposite sides of the mold roll, one of the mold gaps being defined between the mold roll and the support member.

25. The method of claim 24 in which said operating pressure is applied by two nozzle assemblies introducing resin to said mold gaps under pressure, one of the two nozzle assemblies comprising the support member.

26. The method of claim 24 in which said operating pressure is applied by two pressure rolls disposed on opposite sides of the mold roll, one of the pressure rolls comprising the support member.

* * * * *